(12) United States Patent
Asami

(10) Patent No.: US 7,580,205 B2
(45) Date of Patent: Aug. 25, 2009

(54) IMAGING LENS AND IMAGING DEVICE

(75) Inventor: Taro Asami, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/972,445

(22) Filed: Jan. 10, 2008

(65) Prior Publication Data

US 2008/0174887 A1    Jul. 24, 2008

(30) Foreign Application Priority Data

Jan. 22, 2007    (JP) .......................... P2007-011288

(51) Int. Cl.
*G02B 9/60* (2006.01)
(52) U.S. Cl. ...................... 359/762; 359/770
(58) Field of Classification Search ................ 359/752, 359/756, 762, 763, 770
See application file for complete search history.

(56) References Cited

U.S. PATENT DOCUMENTS 6,038,085 A * 3/2000 Nakazawa .................. 359/753

7,023,628 B1    4/2006 Ning

FOREIGN PATENT DOCUMENTS

| JP | 61-123810 A | 6/1986 |
|---|---|---|
| JP | 2599312 B2 | 1/1997 |
| JP | 2002-98886 A | 4/2002 |

* cited by examiner

*Primary Examiner*—Alicia M Harrington
(74) *Attorney, Agent, or Firm*—Birch, Stewart, Kolasch & Birch, LLP

(57) ABSTRACT

The imaging lens is provided and includes: in order from the object side, a negative first lens whose concave surface is directed toward the image side; a second lens of a planoconcave lens whose flat surface is directed toward the object side or a biconcave lens whose surface having a larger absolute value of radius of curvature is directed toward the object side; a third biconvex lens; a stop; a positive fourth lens whose surface having a smaller absolute value of radius of curvature is directed toward the image side; and a cemented lens of a positive fifth lens of biconvex shape and a negative sixth lens of meniscus shape, the cemented lens having a positive refractive power, and an Abbe number $v_3$ at d-line of the third lens satisfies a conditional expression (1) $v_3 < 43$.

10 Claims, 16 Drawing Sheets

EXAMPLE 1

EXAMPLE 2

EXAMPLE 4

EXAMPLE 5

EXAMPLE 6

EXAMPLE 7

EXAMPLE 8

EXAMPLE 9

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

IMAGING LENS AND IMAGING DEVICE

BACKGROUND OF THE INVENTION

1. Field of the Invention

The present invention relates to an imaging lens and an imaging device equipped with the imaging lens, and more particularly to a wide angle imaging lens suitable for use in an onboard camera, a camera for a portable terminal, a surveillance camera, and the like, using an imaging element, such as a CCD (Charge-Coupled Device), CMOS (Complementary Metal Oxide Semiconductor), or the like, as well as to an imaging device equipped with the imaging lens.

2. Description of Related Art

An extreme progress has recently been made in miniaturization and an increase in the number of pixels of an imaging element, such as a CCD and CMOS. In step with such a progress, miniaturization of a main body of imaging equipment having the imaging element has also advanced, and miniaturization of the imaging lens incorporated into the imaging equipment is also sought.

Meanwhile, in relation to an onboard camera or a surveillance camera, there has been sought a compact, inexpensive wide-angle lens which exhibits high weather resistance from outside air in a cold district to the inside of a vehicle compartment located in the tropics; which is usable over a wide temperature range; and which has a small F number.

Imaging lenses described in U.S. Pat. No. 7,023,628, Japanese Patent No. 2599312 and JP-A-61-123810 been known as the imaging lens of the foregoing field. U.S. Pat. No. 7,023,628 describes a fisheye lens consisting of five-grouped six lenses. Japanese Patent No. 2599312 describes a wide-angle lens which includes five-grouped six lenses or five-grouped seven lenses and which includes an aspheric lens. JP-A-61-123810 describes a wide-angle lens which is used for a compact camera of a surveillance camera and which consists of five-grouped six lenses or five-grouped seven lenses.

U.S. Pat. No. 7,023,628 describes a bright lens having an F number of 2, but the lens frequently uses a glass material whose refractive index exceeds a value of 1.9 and hence has a drawback of high cost. The lens described in Japanese Patent No. 2599312 uses an aspherical lens. When the lens is formed by using glass as a material, the lens also becomes expensive unfavorably. In addition to being insufficiently wide-angle and miniaturized, the lens described in JP-A-61-123810 forms a dark optical system having an F number of 2.8 to 4.

SUMMARY OF THE INVENTION

An object of an illustrative, non-limiting embodiment of the invention is to provide an imaging lens which is compact, wide-angle, bright, and inexpensive and which also maintains superior optical performance, as well as providing an imaging device equipped with the imaging lens.

According to a first aspect of the invention, there is provided an imaging lens (a first imaging lens) including: in order from an object side of the imaging lens, a first lens having a negative refractive power and having a concave surface directed toward an image side of the imaging lens; a second lens that is one of a planoconcave lens having a flat surface directed toward the object side and a biconcave lens whose surface having a larger absolute value of radius of curvature is directed toward the object side; a third biconvex lens; a stop; a fourth lens whose surface having a smaller absolute value of radius of curvature is directed toward the image side, the fourth lens having a positive refractive power; and a cemented lens having a positive refractive power, the cemented lens including a fifth lens and a sixth lens, the fifth lens having a positive refractive power and having a biconvex shape, the sixth lens having a negative refractive power and having a meniscus shape. Further, an Abbe number $v_3$ at the d-line of the third lens satisfies a conditional expression (1) provided below:

$$v_3 < 43 \qquad (1).$$

The first imaging lens has a simple configuration including five-grouped six lenses, but an attempt is made to achieve a reduction in size and a wider angle by means of the negative first lens and the negative second lens having the foregoing shapes. Various aberrations are well corrected by appropriately selecting the configuration of the positive third lens and the positive fourth lens which are to be arranged in the vicinity of the stop. Balanced chromatic aberration is achieved by arranging, on the image surface side, the cemented lens consisting of the negative lens and the positive lens. Thereby, a compact, bright, inexpensive, wide-angle imaging lens which ensures superior optical performance is provided.

According to a second aspect of the invention, there is provided an imaging lens (a second imaging lens) including: in order from an object side of the imaging lens, a first lens having a negative refractive power and having a concave surface directed toward an image side of the imaging lens; a second lens that is one of a planoconcave lens having a flat surface directed toward the object side and a biconcave lens whose surface having a larger absolute value of radius of curvature is directed toward the object side; a third biconvex lens; a stop; a fourth lens having a positive refractive power; and a cemented lens having a positive refractive power, the cemented lens including a fifth lens and a sixth lens, one of the fifth lens and the sixth lens having a positive refractive power and the other having a negative refractive power. Further, the third lens satisfies conditional expressions (2) and (3) provided below in connection with an Abbe number $v_3$ at the d-line of the third lens and a refractive index $N_3$ at the d-line of the third lens; and the negative lens forming the cemented lens satisfies a conditional expression (4) provided below in connection with an Abbe number $v_n$ at a d-line of the negative lens:

$$25 < v_3 < 35 \qquad (2)$$

$$1.79 < N_3 < 1.87 \qquad (3)$$

$$v_n < 25 \qquad (4).$$

The second imaging lens has a simple configuration including five-grouped six lenses, but an attempt is made to achieve a reduction in size and a wider angle by means of the negative first lens and the negative second lens having the foregoing shapes. Various aberrations are well corrected by appropriately selecting the configuration of the positive third lens and the positive fourth lens which are to be arranged in the vicinity of the stop. Balanced chromatic aberration is achieved by arranging, on the image surface side, the cemented lens consisting of the negative lens and the positive lens; and appropriately selecting a material for the negative lens. Thereby, a compact, bright, inexpensive, wide-angle imaging lens which ensures superior optical performance is provided.

In the first and second imaging lenses, either the positive lens or the negative lens may also be positioned on the object side without regard to the sequence of arrangement of the positive lens and the negative lens constituting the cemented lens.

In the first and second imaging lenses, a refractive index $N_p$ at the d-line of the positive lens constituting the cemented lens, a refractive index $N_n$ at the d-line of the negative lens constituting the cemented lens, an Abbe number $v_p$ at the d-line of the positive lens constituting the cemented lens, and the Abbe number $v_n$ at the d-line of the negative lens constituting the cemented lens may satisfy conditional expressions (5) and (6) provided below:

$$0.05 < N_n - N_p < 0.45 \qquad (5)$$

$$1.5 < v_p/v_n < 5.5 \qquad (6).$$

In the first and second imaging lenses, a composite focal length $f_{12}$ of the first lens and the second lens and the focal length f of the entire system preferably may satisfy a conditional expression (7) provided below $$0.5 < |f_{12}/f| < 2 \qquad (7).$$

In the first and second imaging lenses, a composite focal length $f_{123}$ of the first lens, the second lens, and the third lens may satisfy a conditional expression (8) provided below $$f_{123} < 0 \qquad (8).$$

In the first and second imaging lenses, a composite focal length $f_{56}$ of the fifth lens and the sixth lens and the focal length f of the entire system may satisfy a conditional expression (9) provided below $$3 < f_{56}/f < 1 \qquad (9).$$

In the first and second imaging lenses, a distance L, along the optical axis, from the object-side surface of the first lens to an image-side focal plane of the entire system and the focal length f of the entire system may satisfy a conditional expression (10) provided below $$7 < L/f < 14 \qquad (10).$$

According to an aspect of the invention, there is provided an imaging device including: the above-described imaging lens; and an imaging element for converting an optical image formed by means of the imaging lens into an electric signal.

BRIEF DESCRIPTION OF THE DRAWINGS

The features of the invention will appear more filly upon consideration of the exemplary embodiment of the invention, which are schematically set forth in the drawings, in which.

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the present invention, despite a simple configuration including five-grouped six lenses, an attempt can be made to achieve a reduction in size and a wider angle by means of appropriately selecting shapes of the lenses and a material for the lenses. A bright, inexpensive imaging lens and an imaging device equipped with the imaging lens can be provided.

Figure 1:
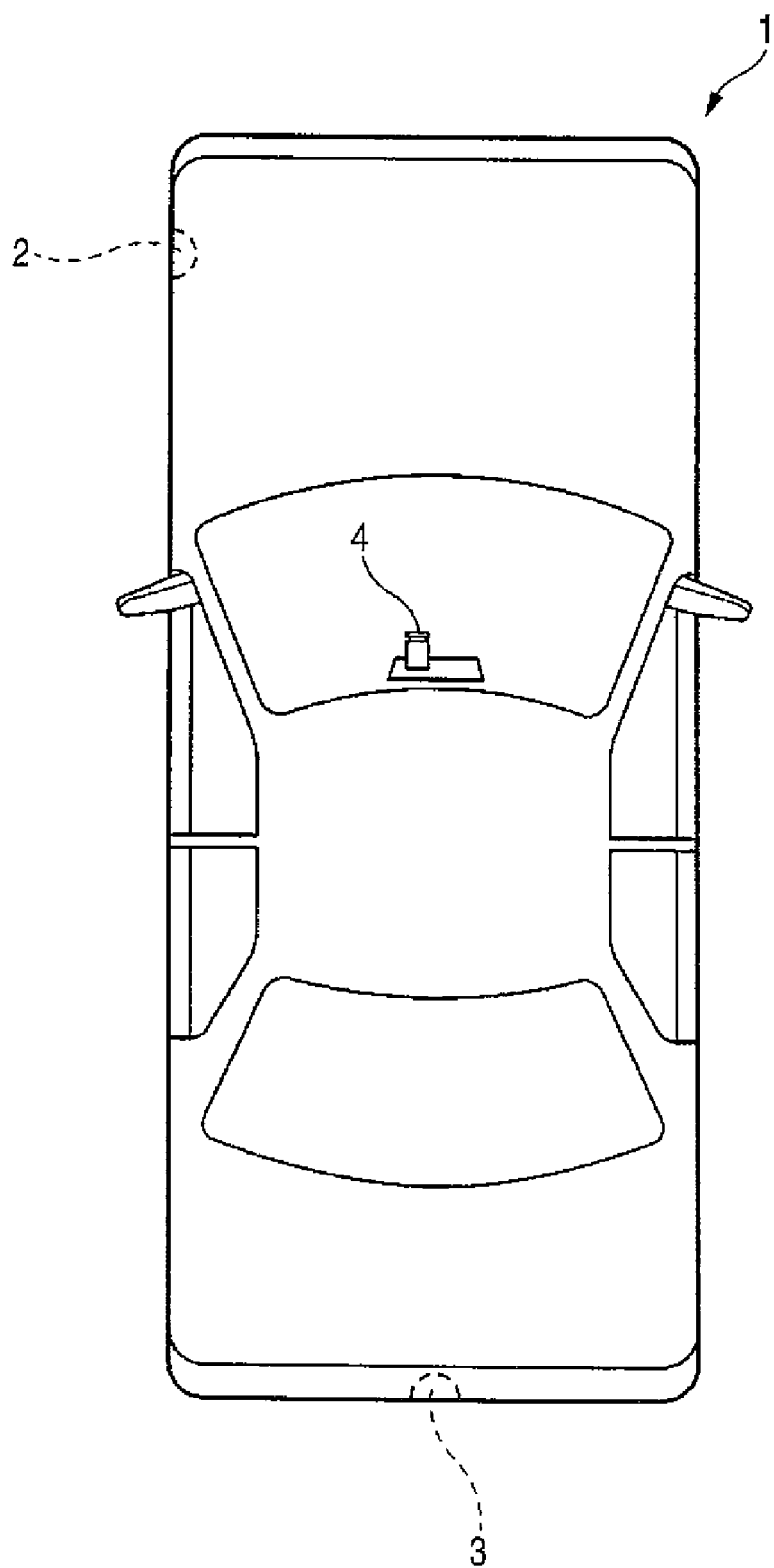
FIG. 1 is a view for describing the arrangement of an onboard imaging device of an exemplary embodiment of the present invention.

An exemplary embodiment of an imaging lens of the present invention and an embodiment of an imaging device equipped with the imaging lens will be described in detail hereunder by reference to the drawings. The imaging lens of the present embodiment can be used for an onboard camera, a camera for a portable terminal a surveillance camera; and can be suitably used especially for an onboard camera which photographs views in the forward, side, and rear of an automobile, and the like. FIG. 1 shows, as an example use, the imaging lens and the imaging device, both of which pertain to the present embodiment and which are mounted on an automobile 1.

In FIG. 1, the automobile 1 has an external camera 2 for imaging a view in the range of a dead angle on the side of a front passenger seat; an external camera 3 for imaging a view in the range of a dead angel on the back side of the automobile 1; and an internal camera 4 mounted on the back of a rearview mirror for imaging the same field of view as that of a driver. The external camera 2, the external camera 3, and the internal camera 4 are imaging devices and each have an imaging lens 5 and an imaging element 6 for converting an optical image formed by the imaging lens 5 into an electric signal.

Figure 2:
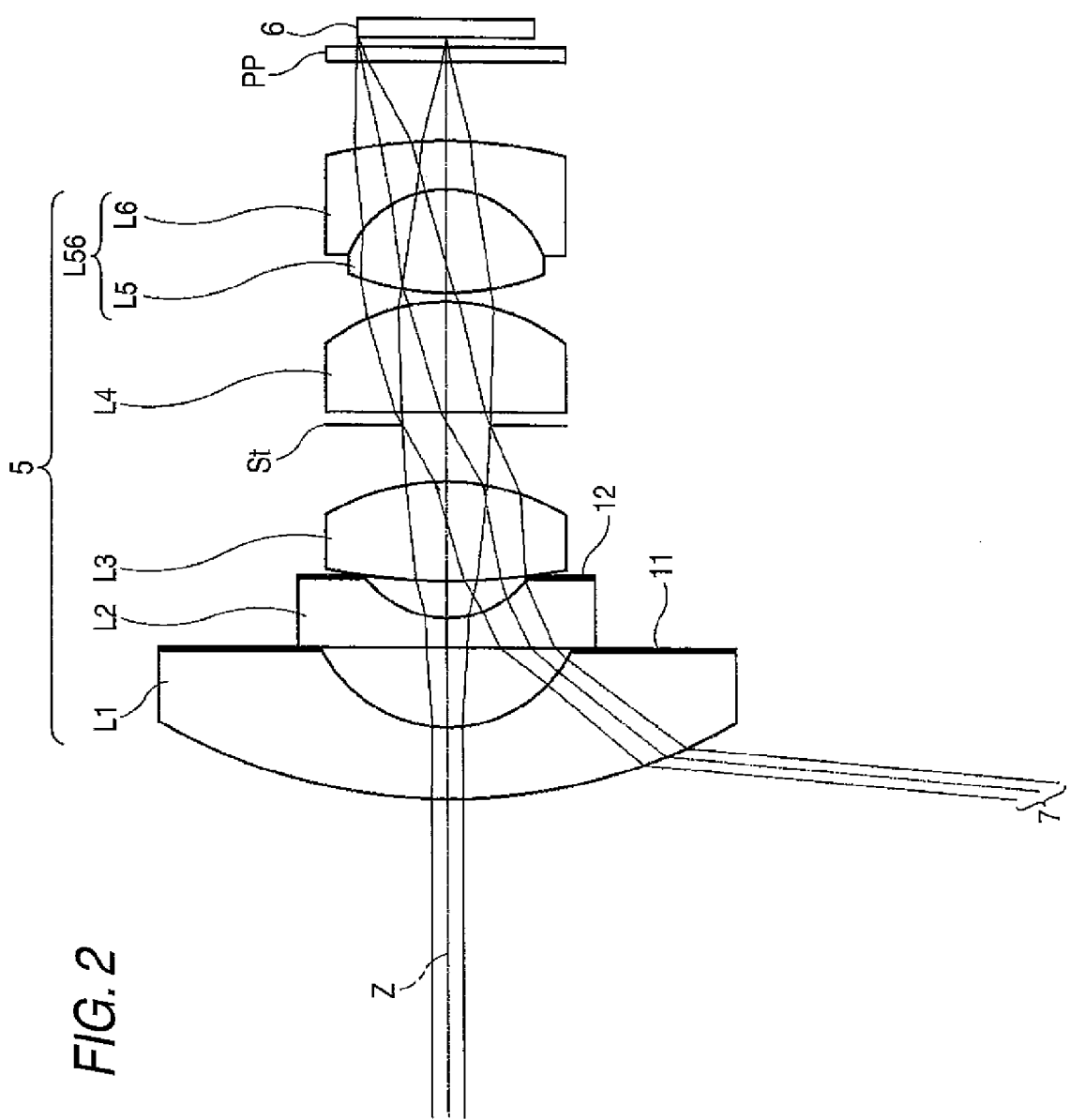
FIG. 2 is a cross-sectional view of an optical system pertaining to an example configuration of an imaging lens of an exemplary embodiment of the present invention.

FIG. 2 shows a cross-sectional view of an optical system which is an example configuration of the imaging lens 5 of the embodiment of the present invention. The example configuration shown in FIG. 2 corresponds to a lens configuration of a first example to be described later. The imaging lens 5 has five-grouped six lenses, in which a first lens L1, a second lens L2, a third lens L3, an aperture diaphragm St, a fourth lens L4, and a cemented lens L56 including a fifth lens L5 and a sixth lens L6 are arranged, in order from an object side along an optical axis Z.

An imaging surface of the imaging element 6, which is a solid-state imaging element of a CCD image sensor or the like, is provided on an image-formation surface of the imaging lens 5. According to the configuration of a camera to which the lens is to be attached, various flat optical members PP; for example, cover glass for protecting an imaging plane, an infrared cut-off filter, and the like, are interposed between the imaging lens 5 and the imaging element 6.

In the imaging lens 5, a light flux passing outside an effective aperture located between the first lens L1 and the second L2 reaches the imaging plane as stray light, which may cause a ghost image. A light flux 7 shown in FIG. 1 is one which enters at the maximum angle of view. Since a light flux passing through the aperture further outside the location where the light flux 7 passes may turn into stray light, placing shielding means 11 between the first lens L1 and the second lens L2 to block stray light is desirable. An area of a surface of the first lens L1, facing the second lens L2, which is outside the effective aperture may be coated with opaque pain or provided with an opaque plate material as the shielding means 11. Alternatively, an opaque plate material may also be placed in an optical path between the first lens L1 and the second lens L2 for the light flux which may turn into stray light. In addition to being interposed between the first lens L1 and the second lens L2, the shielding means intended for this purpose may also be placed between other lenses, as required. FIG. 2 shows an example where shielding means 12 having the same configuration as that of the shielding means 11 is provided on an area of a surface of the second lens L2, facing the third lens L3, which is outside the effective aperture.

The configuration and working-effects of the imaging lens 5 of the present embodiment will now be described in detail. The first lens L1 is a negative lens whose concave surface is directed toward an image side. The configuration enables narrowing of a light flux having exited the first lens L1 and miniaturization of the imaging lens. Moreover, when the first lens L1 is embodied as a negative lens of meniscus shape whose convex surface is directed toward an object side as in the case of an embodiment shown in FIG. 2, a light ray of large incident angle can be captured on the object-side convex surface of the first lens L1, and hence the angle of the optical system can be made wider. Moreover, as a result of the first lens being a negative meniscus lens, a Petzval sum can be reduced, so that a field curvature can be corrected over a wide screen area.

Since the first lens L1 is provided most closely to the object side, when the imaging lens is used in a severe environment as in the case of; for example, an onboard camera, a material which is resistant to surface deterioration caused by weather and temperature changes caused by direct sunlight and which is also resistant to chemicals such as oils and fats and a detergent; namely, a material exhibiting high waterproof weather resistance, acid resistance, chemical resistance, and the like, can be used. Moreover, use of a hard material resistant to cracking as a material of the first lens L1 is preferable. Specifically, for example, glass or ceramics, can be used. Ceramics are higher in strength than ordinary glass and possess high heat resistance.

The second lens L2 is a planoconcave lens whose flat surface is directed toward the object side or a biconcave lens whose surface having a larger absolute value of radius of curvature is directed toward the object side. By use of such a negative second lens L2 along with the negative first lens, a reduction in side and a wider angle can be achieved simultaneously.

In the case where the imaging lens of the present embodiment is used in an environment where the lens is susceptible to repeated vibration or physical impact, as in the case of; for example, an onboard camera, when the image-side surface of the first lens assumes a concave shape and when the object-side surface of the second lens assumes a convex shape, dust may be generated as a result of chipping of contacted areas when both lenses are brought into edge contact with each other. A conceivable countermeasure is to insert a mechanical component between the first lens and the second lens, to thus avoid occurrence of edge contact, which will be a factor for an increase in cost. When the image-side surface of the first lens L1 and the object-side surface of the second lens L2 are formed into a plane surface or concave surface as in the present embodiment, occurrence of dust, which would otherwise be caused at the time of edge contact, can be prevented without involvement of an increase in cost.

The third lens L3 is of biconvex shape, and a material is selected in such a manner that an Abbe number $v_3$ at d-line of the lens satisfies a relationship of $$v_3 < 43 \qquad (1).$$

The third lens L3 is disposed in the vicinity of the location of the aperture diaphragm on which light rays densely concentrate, and acts on diverging rays exiting from the first lens L1 and the second lens L2, which are negative lenses, in a direction to cause the rays to converge. As a result of the third lens L3 being formed into a biconcave shape, a curvature of field can be corrected well. When the third lens L3 is formed into a convex lens whose surface having a larger absolute value of radius of curvature is directed toward the object side as in the case of the example shown in FIG. 2, the field curvature can be corrected in a more superior manner. Moreover, a material for the third lens L3 is selected so as to satisfy the conditional expression (1), lateral chromatic aberration can be corrected well.

Moreover, the material can be selected in such a way that the Abbe number $v_3$ at the d-line of the third lens satisfies a relationship of $$v_3 < 37 \qquad (1\text{-}1).$$

In this case, the lateral chromatic aberration can be corrected well.

Further, the material can be selected in such a way that the Abbe number $v_3$ at the d-line of the third lens and a refractive index $N_3$ at the d-line satisfy a relationship of $$25 < v_3 < 35 \qquad (2)$$

$$1.79 < N_3 < 1.87 \qquad (3).$$

When the lower limit of the conditional expression (2) is crossed, longitudinal chromatic aberration becomes greater unfavorably. When the Abbe number $v_3$ at the d-line of the third lens is brought into the upper limit of the conditional expression (2), lateral chromatic aberration of can be corrected more preferably.

In addition to satisfying the conditional expression (2), the third lens L3 may further satisfy the conditional expression (3). In this case, when the lower limit of the conditional expression (3) is crossed, a field curvature becomes unfavorably greater. In contrast, when the upper limit of the conditional expression (3) is crossed, an available material becomes expensive, which unfavorably adds to cost.

Further, the material can be selected in such a way that the Abbe number $v_3$ at the d-line of the third lens and the refractive index $N_3$ at the d-line satisfy a relationship of $$28 < v_3 < 32 \tag{2-1}$$

$$1.79 < N_3 < 1.82 \tag{3-1}.$$

In this case, chromatic aberration and field curvature can be corrected much better.

The fourth lens L4 has a positive refractive power, and a surface having a smaller absolute value of radius of curvature may be directed toward the image side. In order to correct field curvature well, the fourth lens L4 may be formed into a planoconcave lens or a biconvex lens.

The cemented lens L56 has entirely a positive refractive power and includes two lenses: one having a positive refractive power and the other having a negative refractive power. No limitations are imposed on the sequence of arrangement of the positive lens and the negative lens constituting the cemented lens L56, and either the positive lens or the negative lens may also be positioned on the object side. However, descriptions will be provided hereunder by reference to an example shown in FIG. 2 while a case—where the positive lens corresponds to the fifth lens L5 and where the negative lens corresponds to the six lens L6—is taken as an example. In order to correct chromatic aberration well, the positive fifth lens L5 may be a biconvex shape, and the negative sixth lens L6 may be a meniscus shape.

Of the lenses constituting the cemented lens L56, a material for the sixth lens L6 that is the negative lens can be selected in such a way that an Abbe number $v_n$ at the d-line of the sixth lens satisfies a relationship of $$v_n < 25 \tag{4}.$$

When the upper limit of the conditional expression (4) is crossed, a material for the positive lens constituting the cemented lens 56; namely, the fifth lens L5, is limited to a material which is expensive and hard to machine, in order to correct chromatic aberration well. Since the material becomes a factor for an increase in cost, crossing of the upper limit of the conditional expression (4) is not preferable.

Moreover, the material for the sixth lens L6 can be selected so as to satisfy a relationship of $$v_n < 20 \tag{4-1}.$$

When the material is thus selected, a material having a larger Abbe number can be selected for the positive lens constituting the cemented lens L56; namely, the fifth lens L5, when compared with the case of the previously-described conditional expression (4). Hence, the range of available materials is broadened, and correction of chromatic aberration and field curvature become facilitated.

In the cemented lens L56, the refractive index $N_p$ at the d-line of the positive lens (the fifth lens L5 of the present embodiment) constituting the cemented lens 56, the refractive index $N_n$ the d-line of the negative lens (the sixth lens L6 of the present embodiment) constituting the cemented lens L56, an Abbe number $v_p$ at the d-line of the positive lens constituting the cemented lens L56, and the Abbe number $v_n$ at the d-line of the negative lens constituting the cemented lens 56 may satisfy conditional expressions (5) and (6) provided below:

$$0.05 < N_n - N_p < 0.45 \tag{5}$$

$$1.5 < v_p/v_n < 5.5 \tag{6}.$$

When the lower limit of the conditional expression (5) is crossed, the radius of curvature of the cemented surface becomes smaller, which makes the lens difficult to machine. When the upper limit of the conditional expression (5) is crossed, limitation is imposed on practically-available materials, and an available material becomes expensive, which places a hindrance to cost cutting. When the lower limit of the conditional expression (6) is crossed, difficulty is encountered in well correcting longitudinal chromatic aberration and lateral chromatic aberration. When the upper limit of the conditional expression (6) is crossed, there are no currently-available materials, and the lens becomes impracticable to realize.

Moreover, the cemented lens L56 may satisfy:

$$1.5 < v_5/v_6 < 4.3 \tag{6-1}.$$

When the lower limit of the conditional expression (6-1) is crossed, difficulty is encountered in well correcting longitudinal chromatic aberration and lateral chromatic aberration. When the upper limit of the conditional expression (6-1) is crossed, a material for the fifth lens L5 becomes expensive and difficult to machine. By confining the value of the Abbe number to the upper limit of the conditional expression (6-1), cost reduction can be pursued further.

When the cemented lens L56 is constituted by the positive fifth lens L5 and the negative sixth lens L6 and when no limitation is specifically imposed on shapes of these lenses, it is desirable that the following relationship be satisfied:

$$1.5 < v_5/v_6 \tag{6-2}.$$

When the lower limit of the conditional expression (6-2) is crossed, it becomes difficult to well correct longitudinal chromatic aberration and lateral chromatic aberration.

Moreover, in the imaging lens 5, a composite focal length $f_{12}$ of the first lens and the second lens and the focal length f of the entire system may satisfy a conditional expression (7) provided below:

$$0.5 < |f_{12}/f| < 2 \tag{7}.$$

When the lower limit of the conditional expression (7) is crossed, the imaging lens can be made wider-angle readily, but the field curvature becomes great, thereby posing difficulty in acquiring a superior image. When the upper limit of the conditional expression (7) is crossed, difficulty is encountered in rendering the imaging lens wider-angle, or the lens system becomes bulky.

In the imaging lens 5, a composite focal length $f_{123}$ of the first lens, the second lens, and the third lens may satisfy a conditional expression (8) provided below:

$$f_{123} < 0 \tag{8}.$$

When the focal length goes beyond the range defined by the conditional expression (8), difficulty is encountered in rendering the imaging lens wider-angle, or the lens system becomes bulky. A wider angle and a reduction in side can be achieved simultaneously by satisfying the conditional expression (8).

In the imaging lens 5, a composite focal length $f_{56}$ of the fifth lens and the sixth lens and the focal length f of the entire system may satisfy a conditional expression (9) provided below:

$$3 < f_{56}/f < 10 \tag{9}.$$

When the lower limit of the conditional expression (9) is crossed, difficulty is encountered in correcting a field curvature well. When the upper limit of the conditional expression (9) is crossed, power of the cemented lens becomes weak, and difficulty is encountered in well correcting chromatic aberration.

In the imaging lens 5, a distance L from the object-side surface of the first lens to the image-side focal surface of the first lens along the optical axis Z and the focal length f of the entire system may satisfy:

$$7 < L/f < 14 \quad (10).$$

When the lower limit of the conditional expression (10) is crossed, difficulty is encountered in rendering the lens wider-angle. When the upper limit of the conditional expression (10) is crossed, the lens becomes bulky.

In the imaging lens 5, a center thickness D1 of the first lens L1 and the focal length f of the entire system may satisfy:

$$0.55 < D1/f \quad (11).$$

When the imaging lens 5 is used in the application, such as an onboard camera purpose, the first lens L1 is required to have strength against various physical impacts. When the lower limit of the conditional expression (11) is crossed, the first lens L1 becomes thin, to thus become vulnerable to cracking. Thus, the strength of the first lens against various physical impacts becomes weak.

In the imaging lens 5, a composite focal length $f_{456}$ of the fourth lens L4, the fifth lens L5, and the sixth lens L6 and the focal length f of the entire system may satisfy:

$$1.7 < f_{456}/f < 3.0 \quad (12).$$

When the lower limit of the conditional expression (12) is crossed, back focus becomes shorter, and difficulty is encountered in arranging an optical member PP, such as cover glass, a filter, or the like, between the imaging lens and the imaging element 6. When the upper limit of the conditional expression (12) is crossed, difficult is encountered in well correcting the field curvature.

When the imaging lens 5 is applied to; for instance, an onboard camera, the imaging lens is required to be usable over a wide temperature range from the outside air in the cold district to the compartment of the automobile left in the tropics in summer. Therefore, a material for all of the lenses may be glass. Specifically, the material can be used over a wide temperature range from −40° C. to 125° C. In order to inexpensively manufacture lenses, all of the lenses can be spherical lenses.

According to the imaging lens of the previously-described embodiment, the shapes and glass materials of the lenses are appropriately selected in relation to the simple configuration consisting of the five-grouped six lenses. Hence, an attempt can be made to achieve a wider angle and a reduction in size while superior optical performance is ensured, and an inexpensive lens can be embodied. For instance, there can be implemented compact, inexpensive, superior optical performance while satisfying specifications; namely, a bright F/number of 2.0 and a wide angle of 100° or more for a full angle of view.

Specific numerical embodiments of the imaging lens 5 of the embodiment will now be described.

FIRST EXAMPLE

Table 1 shows values of specifications, design specifications, and focal lengths of the imaging lens of the first example. In Table 1, Si designates the i-th surface number ("i"=1 through 15) which gradually increases toward the image side while the surface of a constituent element located most closely to the object side is taken as the first. Ri designates a radius of curvature of the i-th plane ("i"=1 through 15). Di designates on-axis surface spacing between the i-th plane ("i"=1 through 14) and the i+1$^{th}$ plane along the optical axis Z. Ndj designates a refractive index of the j-th (j=1 through 7) lens, the number of which gradually increases toward the image side while the lens positioned most closely to the object side is taken as the first, or the optical member PP at the d-line (587.6 nm); and vdj designates an Abbe number of the j$^{th}$ lens or the optical member PP at the d-line. Nd7 designates a refractive index of the optical member PP, and vd7 designates an Abbe number of the optical member PP. In Table 1, the unit of a radius of curvature and on-axis surface spacing is mm. The radius of curvature assumes a positive sign when the object-side surface is convex, as well as assuming a negative sign when the image-side surface is convex.

In Table 1, L' designates a distance from the object-side surface of the first lens L1 to the image-side focal surface of the same along the optical axis Z when the optical member PP is interposed between the sixth lens L6 and the image surface; L designates a distance from the object-side surface of the first lens L1 to the image-side focal surface of the same along the optical axis Z (a distance corresponding to the optical member PP is converted into air); F/number designates an F value; 2ω designates a full angle of view; "f" designates a focal length of the entire system; $f_{12}$ designates a composite focal length consisting of the first lens L1 and the second lens L2; $f_{56}$ designates a composite focal length consisting of the fifth lens L5 and the sixth lens L6; $f_{123}$ designates a composite focal length of the first lens L1, the second lens L2, and the third lens L3; and $f_{456}$ designates a composite focal length of the fourth lens L4, the fifth lens L5, and the sixth lens L6. Symbols provided in the table also apply to corresponding symbols in Tables 2 through 9.

Figure 3:
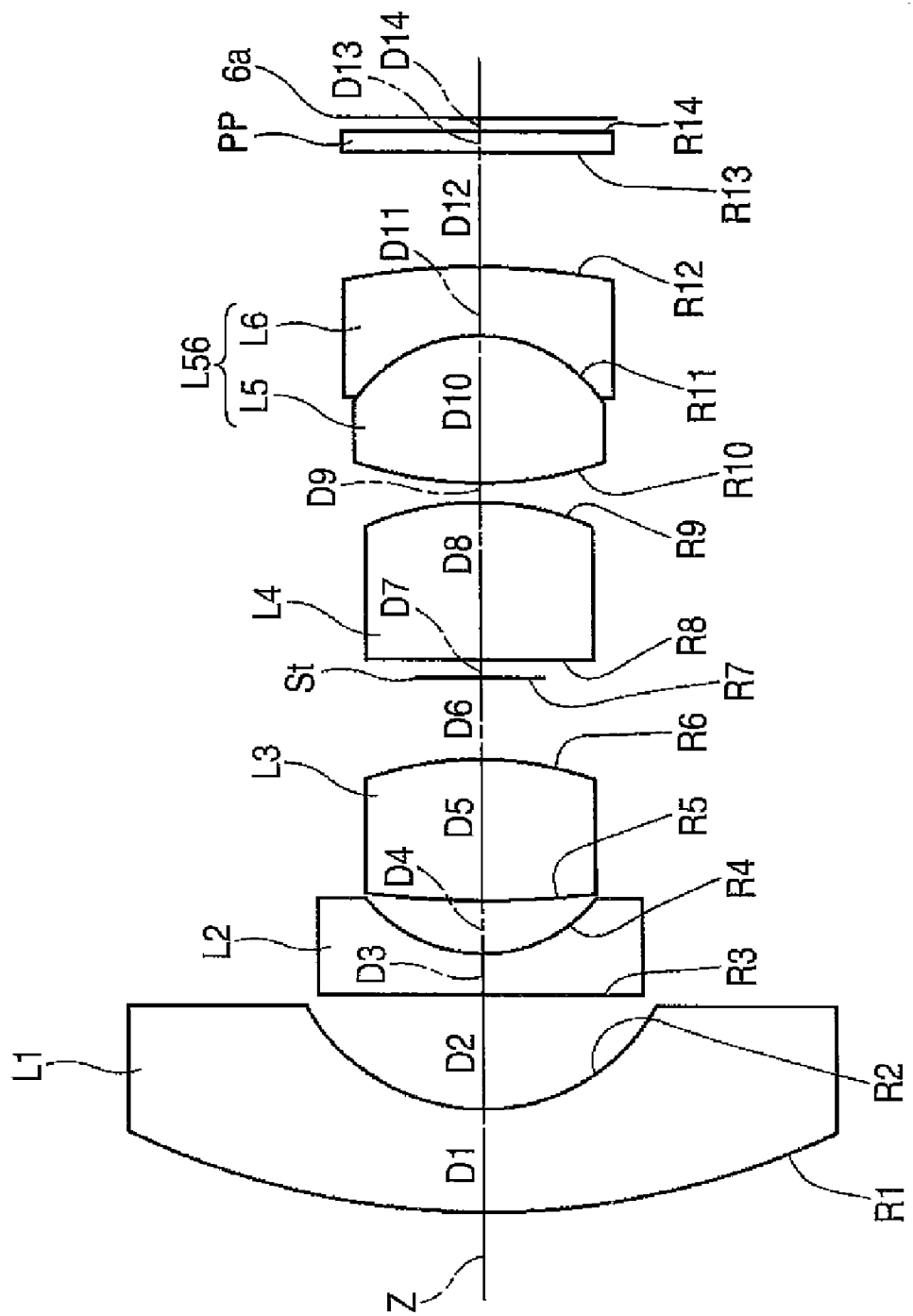
FIG. 3 is a cross-sectional view showing a lens configuration of an imaging lens of a first example of the present invention.

The block diagram of the lens of the first embodiment is shown in FIG. 3. Reference symbol Ri ("i"=1 through 14) shown in FIG. 3 corresponds to Ri, and Di ("i"=1 through 14) of the same corresponds to Di. An aperture diaphragm St shown in FIG. 3 does not represent the shape and size of the diaphragm but the location of the diaphragm along the optical axis Z. Reference symbols in Table 1 and FIG. 3 are provided along with the aperture diaphragm St and the optical member PP. In FIG. 3, an imaging surface 6a of the imaging element 6 is illustrated as an image-formation surface.

TABLE 1

Example 1

| Si | Ri | Di | Ndj | vdj |
|---|---|---|---|---|
| 1 | 15.33 | 1.95 | 1.8348 | 42.7 |
| 2 | 3.76 | 2.16 | | |
| 3 | ∞ | 0.80 | 1.7725 | 49.6 |
| 4 | 2.78 | 1.01 | | |
| 5 | 17.21 | 2.69 | 1.8340 | 37.2 |
| 6 | −6.37 | 1.55 | | |
| 7 (Aperture Diaphragm) | ∞ | 0.34 | | |
| 8 | ∞ | 3.00 | 1.7550 | 52.3 |
| 9 | −5.22 | 0.24 | | |
| 10 | 7.10 | 2.80 | 1.7130 | 53.9 |
| 11 | −2.86 | 1.31 | 1.9229 | 18.9 |
| 12 | −13.18 | 2.18 | | |
| 13 | ∞ | 0.40 | 1.5168 | 64.2 |
| 14 | ∞ | 0.25 | | |
| 15 (Imaging Surface) | ∞ | | | |

| | | |
|---|---|---|
| | L' | 20.7 |
| | L | 20.6 |

TABLE 1-continued

| Example 1 | |
|---|---|
| FNo. | 2.0 |
| 2ω | 177.0 |
| f | 1.8 |
| $f_{12}$ | −1.9 |
| $f_{56}$ | 10.6 |
| $f_{123}$ | −9.4 |
| $f_{456}$ | 4.3 |

SECOND EXAMPLE

Figure 4:
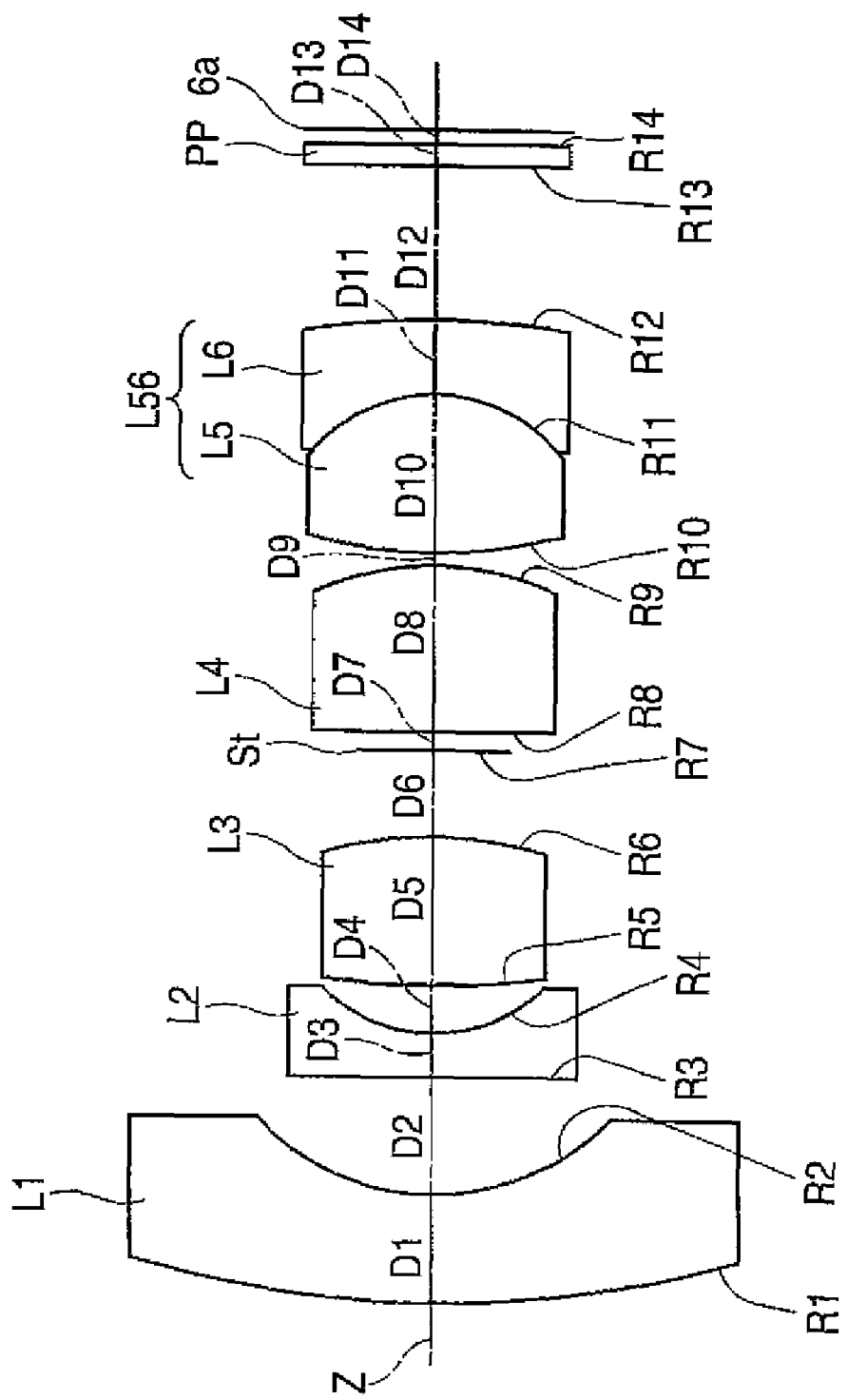
FIG. 4 is a cross-sectional view showing a lens configuration of an imaging lens of a second example of the present invention.

Table 2 shows values of specifications of an imaging lens of a second example, and FIG. 4 shows a block diagram of the lens. In FIG. 4, reference symbols Ri and Di correspond to Ri and Di of Table 2.

TABLE 2

| Example 2 | | | | |
|---|---|---|---|---|
| Si | Ri | Di | Ndj | νdj |
| 1 | 19.31 | 1.94 | 1.8348 | 42.7 |
| 2 | 4.34 | 2.11 | | |
| 3 | ∞ | 0.80 | 1.7725 | 49.6 |
| 4 | 2.81 | 0.87 | | |
| 5 | 15.91 | 2.68 | 1.8340 | 37.2 |
| 6 | −6.79 | 1.55 | | |
| 7 (Aperture Diaphragm) | ∞ | 0.34 | | |
| 8 | 246.12 | 3.00 | 1.7550 | 52.3 |
| 9 | −5.15 | 0.24 | | |
| 10 | 8.61 | 2.85 | 1.7130 | 53.9 |
| 11 | −2.92 | 1.34 | 1.9229 | 18.9 |
| 12 | −15.57 | 2.77 | | |
| 13 | ∞ | 0.40 | 1.5168 | 64.2 |
| 14 | ∞ | 0.25 | | |
| 15 (Imaging Surface) | ∞ | | | |
| L' | | 21.1 | | |
| L | | 21.0 | | |
| FNo. | | 2.0 | | |
| 2ω | | 136.8 | | |
| f | | 2.1 | | |
| $f_{12}$ | | −2.0 | | |
| $f_{56}$ | | 14.3 | | |
| $f_{123}$ | | −8.3 | | |
| $f_{456}$ | | 4.7 | | |

THIRD EXAMPLE

Figure 5:
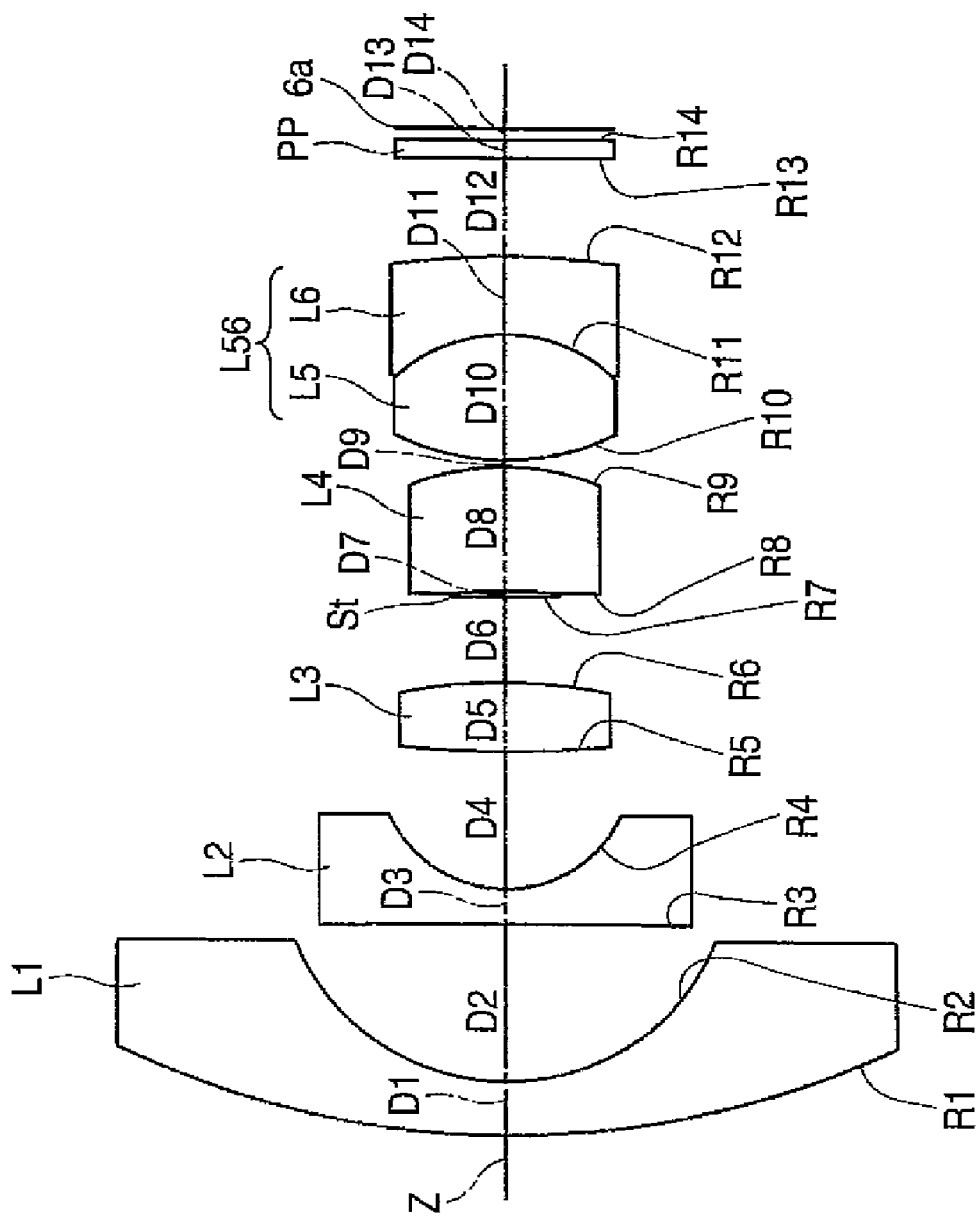
FIG. 5 is a cross-sectional view showing a lens configuration of an imaging lens of a third example of the present invention.

Table 3 shows values of specifications of an imaging lens of a third example, and FIG. 5 shows a block diagram of the lens. In FIG. 5, reference symbols Ri and Di correspond to Ri and Di of Table 3.

TABLE 3

| Example 3 | | | | |
|---|---|---|---|---|
| Si | Ri | Di | Ndj | νdj |
| 1 | 20.00 | 1.20 | 1.5168 | 64.2 |
| 2 | 5.00 | 3.52 | | |
| 3 | −573.00 | 0.80 | 1.5168 | 64.2 |
| 4 | 2.79 | 3.06 | | |
| 5 | 23.05 | 1.55 | 1.8348 | 42.7 |
| 6 | −11.08 | 1.92 | | |

TABLE 3-continued

| Example 3 | | | | |
|---|---|---|---|---|
| 7 (Aperture Diaphargm) | ∞ | 0.13 | | |
| 8 | −11.91 | 2.79 | 1.7550 | 52.3 |
| 9 | −5.30 | 0.15 | | |
| 10 | 5.42 | 2.81 | 1.7130 | 53.9 |
| 11 | −3.50 | 1.76 | 1.9229 | 18.9 |
| 12 | −16.53 | 2.22 | | |
| 13 | ∞ | 0.40 | 1.5168 | 64.2 |
| 14 | ∞ | 0.25 | | |
| 15 (Imaging Surface) | ∞ | | | |
| L' | | 22.6 | | |
| L | | 22.4 | | |
| FNo. | | 2.0 | | |
| 2ω | | 166.0 | | |
| f | | 1.8 | | |
| $f_{12}$ | | −3.2 | | |
| $f_{56}$ | | 8.1 | | |
| $f_{123}$ | | −20.7 | | |
| $f_{456}$ | | 4.5 | | |

FOURTH EXAMPLE

Figure 6:
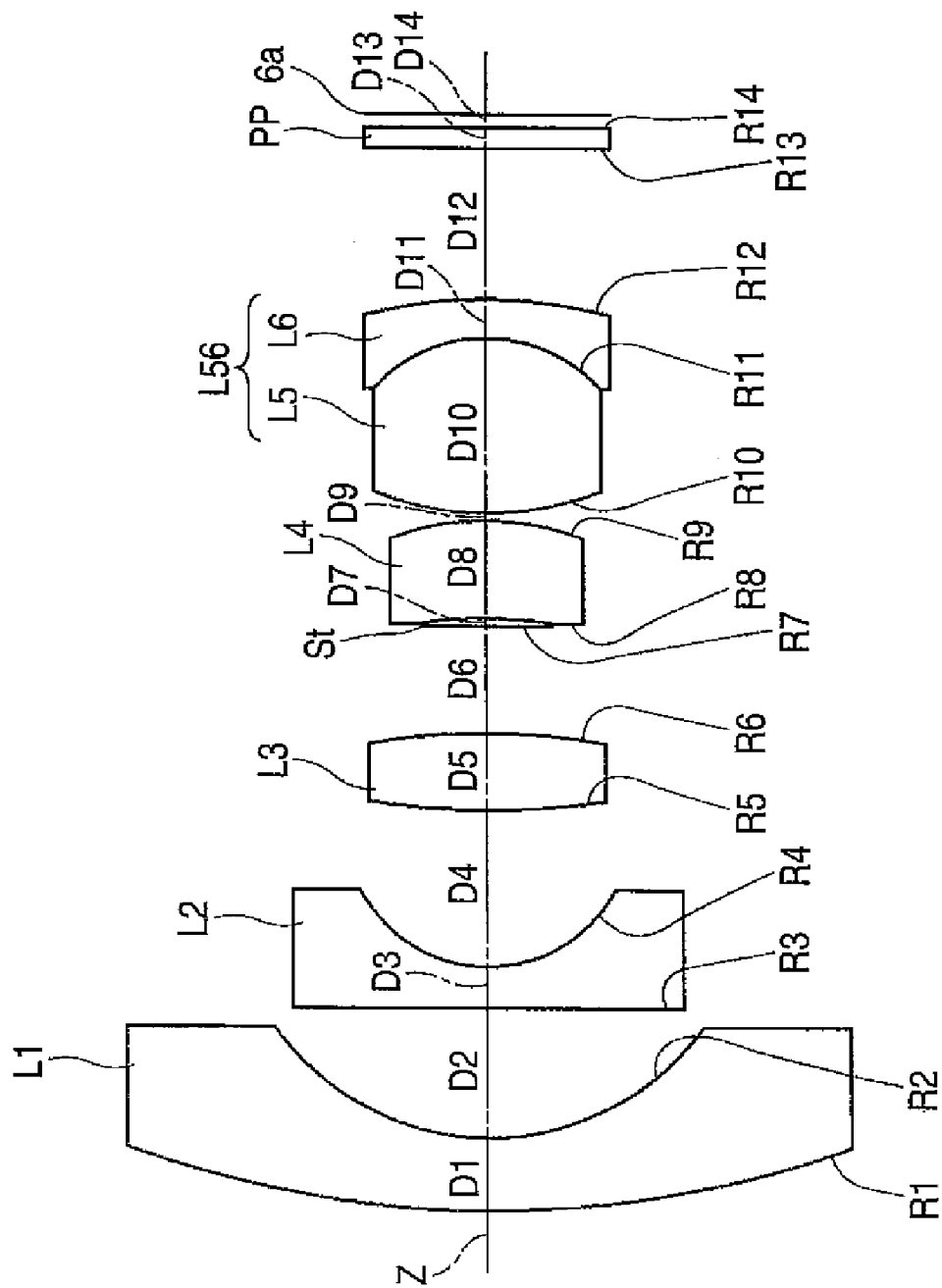
FIG. 6 is a cross-sectional view showing a lens configuration of an imaging lens of a fourth example of the present invention.

Table 4 shows values of specifications of an imaging lens of a fourth example, and FIG. 6 shows a block diagram of the lens. In FIG. 6, reference symbols Ri and Di correspond to Ri and Di of Table 4.

TABLE 4

| Example 4 | | | | |
|---|---|---|---|---|
| Si | Ri | Di | Ndj | νdj |
| 1 | 20.00 | 1.40 | 1.5168 | 64.2 |
| 2 | 5.00 | 2.52 | | |
| 3 | −573.00 | 0.80 | 1.5168 | 64.2 |
| 4 | 2.79 | 3.04 | | |
| 5 | 15.53 | 1.49 | 1.8348 | 42.7 |
| 6 | −13.09 | 2.07 | | |
| 7 (Aperture Diaphgram) | ∞ | 0.16 | | |
| 8 | −8.37 | 1.89 | 1.7550 | 52.3 |
| 9 | −5.26 | 0.15 | | |
| 10 | 5.98 | 3.41 | 1.7130 | 53.9 |
| 11 | −2.99 | 0.75 | 1.9229 | 18.9 |
| 12 | −9.41 | 2.92 | | |
| 13 | ∞ | 0.40 | 1.5168 | 64.2 |
| 14 | ∞ | 0.25 | | |
| 15 (Imaging Surface) | ∞ | | | |
| L' | | 21.2 | | |
| L | | 21.1 | | |
| FNo. | | 2.0 | | |
| 2ω | | 139.4 | | |
| f | | 2.1 | | |
| $f_{12}$ | | −3.3 | | |
| $f_{56}$ | | 7.3 | | |
| $f_{123}$ | | −24.7 | | |
| $f_{456}$ | | 4.8 | | |

FIFTH EXAMPLE

Figure 7:
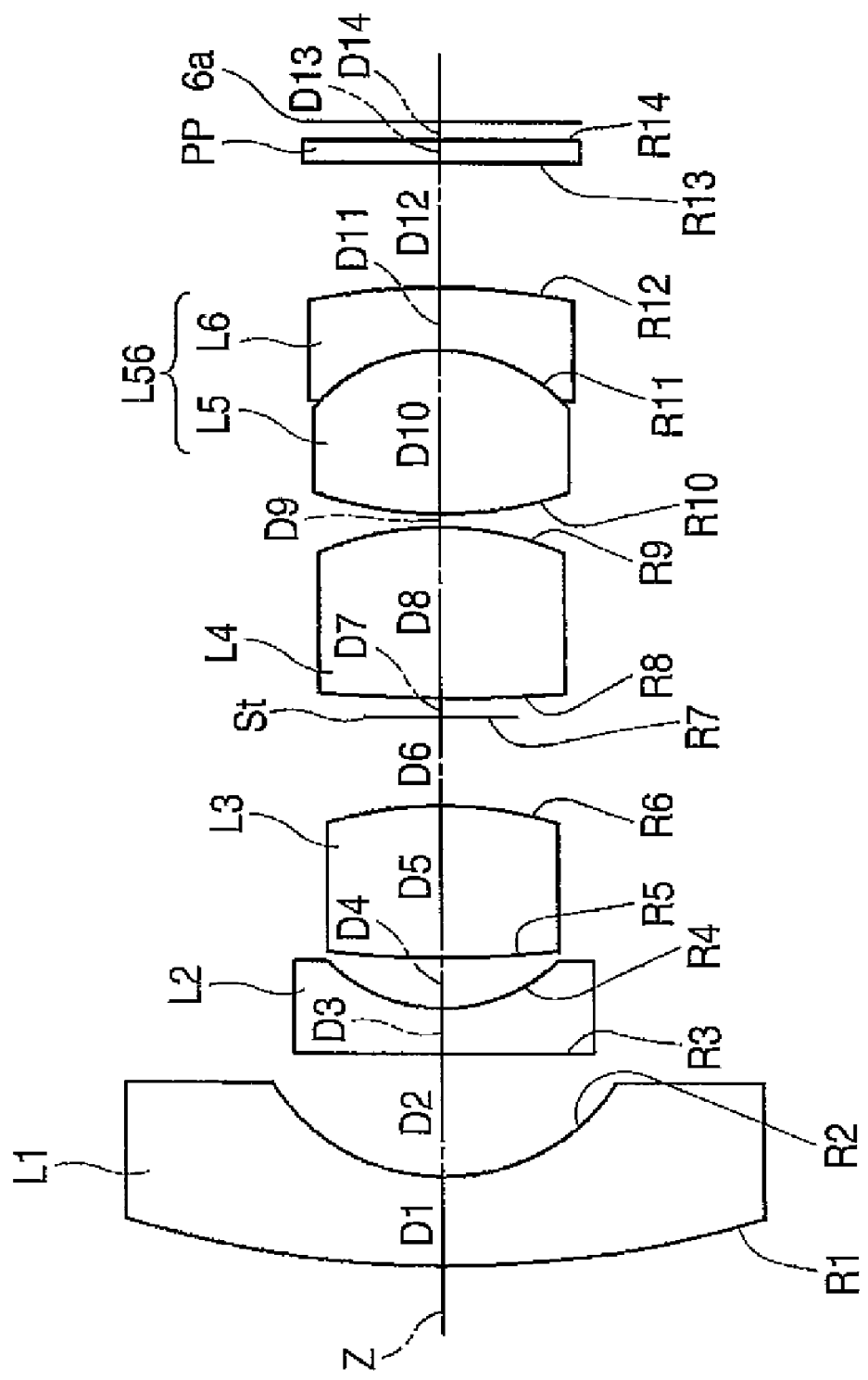
FIG. 7 is a cross-sectional view showing a lens configuration of an imaging lens of a fifth example of the present invention.

Table 5 shows values of specifications of an imaging lens of a fifth example, and FIG. 7 shows a block diagram of the lens. In FIG. 7, reference symbols Ri and Di correspond to Ri and Di of Table 5.

TABLE 5

| | Example 5 | | | |
|---|---|---|---|---|
| Si | Ri | Di | Ndj | vdj |
| 1 | 18.99 | 1.55 | 1.8348 | 42.7 |
| 2 | 3.51 | 2.16 | | |
| 3 | ∞ | 0.80 | 1.7725 | 49.6 |
| 4 | 2.80 | 0.89 | | |
| 5 | 17.17 | 2.66 | 1.8467 | 23.8 |
| 6 | −6.66 | 1.55 | | |
| 7 (Aperture Diaphragm) | ∞ | 0.34 | | |
| 8 | 28.69 | 3.00 | 1.7550 | 52.3 |
| 9 | −5.15 | 0.23 | | |
| 10 | 6.54 | 2.88 | 1.5831 | 59.4 |
| 11 | −2.90 | 1.09 | 1.9229 | 18.9 |
| 12 | −11.34 | 2.25 | | |
| 13 | ∞ | 0.40 | 1.5168 | 64.2 |
| 14 | ∞ | 0.25 | | |
| 15 (Imaging Surface) | ∞ | | | |

| | |
|---|---|
| L' | 20.0 |
| L | 19.9 |
| FNo. | 2.0 |
| 2ω | 170.2 |
| f | 1.8 |
| $f_{12}$ | −1.7 |
| $f_{56}$ | 17.1 |
| $f_{123}$ | −6.8 |
| $f_{456}$ | 4.5 |

SIXTH EXAMPLE

Figure 8:
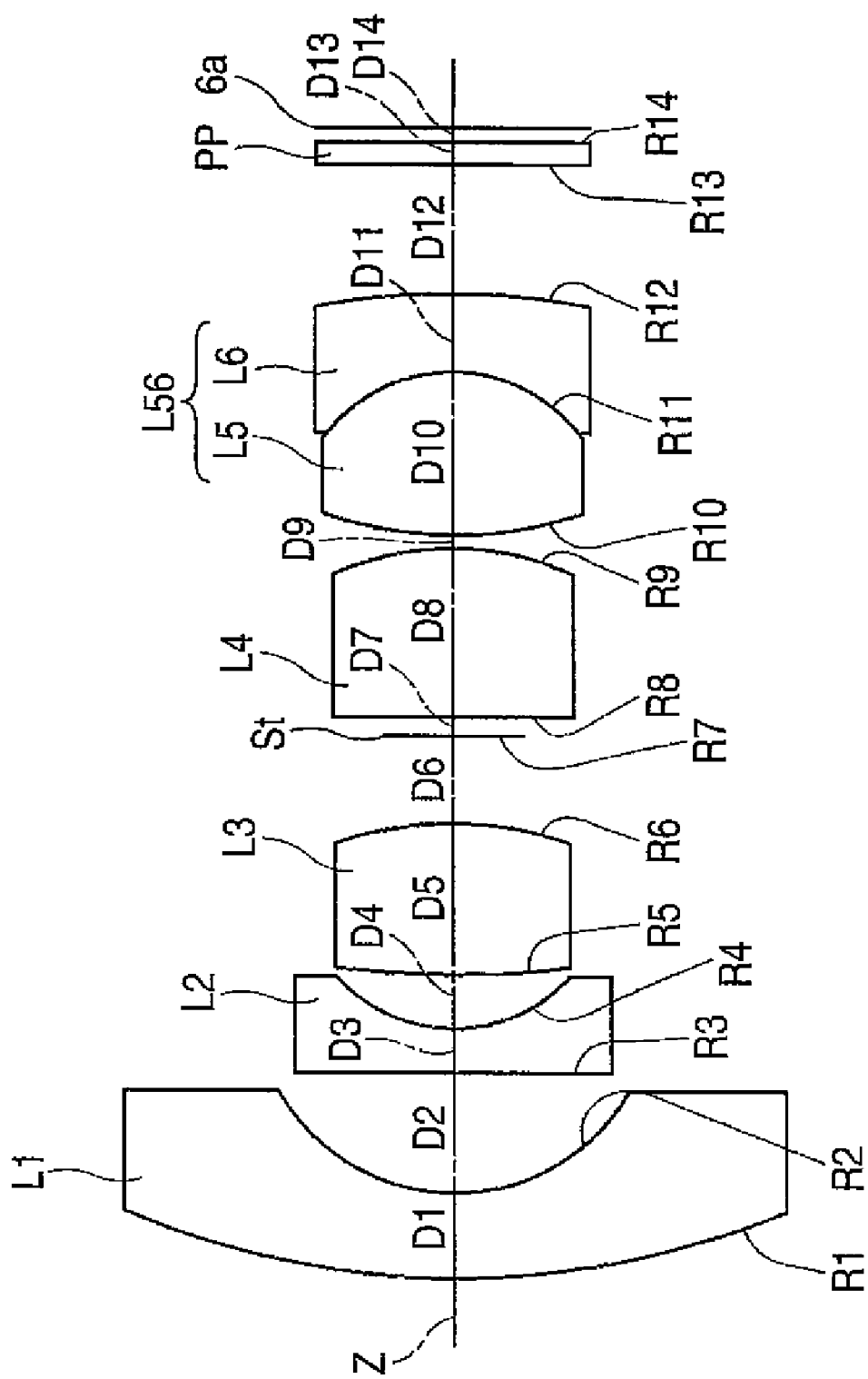
FIG. 8 is a cross-sectional view showing a lens configuration of an imaging lens of a sixth example of the present invention.

Table 6 shows values of specifications of an imaging lens of a sixth example, and FIG. 8 shows a block diagram of the lens. In FIG. 8, reference symbols Ri and Di correspond to Ri and Di of Table 6.

TABLE 6

| | Example 6 | | | |
|---|---|---|---|---|
| Si | Ri | Di | Ndj | vdj |
| 1 | 14.81 | 1.50 | 1.8348 | 42.7 |
| 2 | 3.58 | 2.12 | | |
| 3 | ∞ | 0.80 | 1.7725 | 49.6 |
| 4 | 2.80 | 0.96 | | |
| 5 | 17.14 | 2.69 | 1.7999 | 29.8 |
| 6 | −6.37 | 1.55 | | |
| 7 (Aperture Diaphragm) | ∞ | 0.34 | | |
| 8 | −422.19 | 3.00 | 1.7550 | 52.3 |
| 9 | −5.20 | 0.24 | | |
| 10 | 7.12 | 2.89 | 1.7130 | 53.9 |
| 11 | −2.88 | 1.38 | 1.9229 | 18.9 |
| 12 | −13.27 | 2.30 | | |
| 13 | ∞ | 0.40 | 1.5168 | 64.2 |
| 14 | ∞ | 0.25 | | |
| 15 (Imaging Surface) | ∞ | | | |

| | |
|---|---|
| L' | 20.4 |
| L | 20.3 |
| FNo. | 2.0 |
| 2ω | 168.8 |
| f | 1.7 |
| $f_{12}$ | −1.8 |
| $f_{56}$ | 10.6 |
| $f_{128}$ | −7.6 |
| $f_{456}$ | 4.4 |

SEVENTH EXAMPLE

Figure 9:
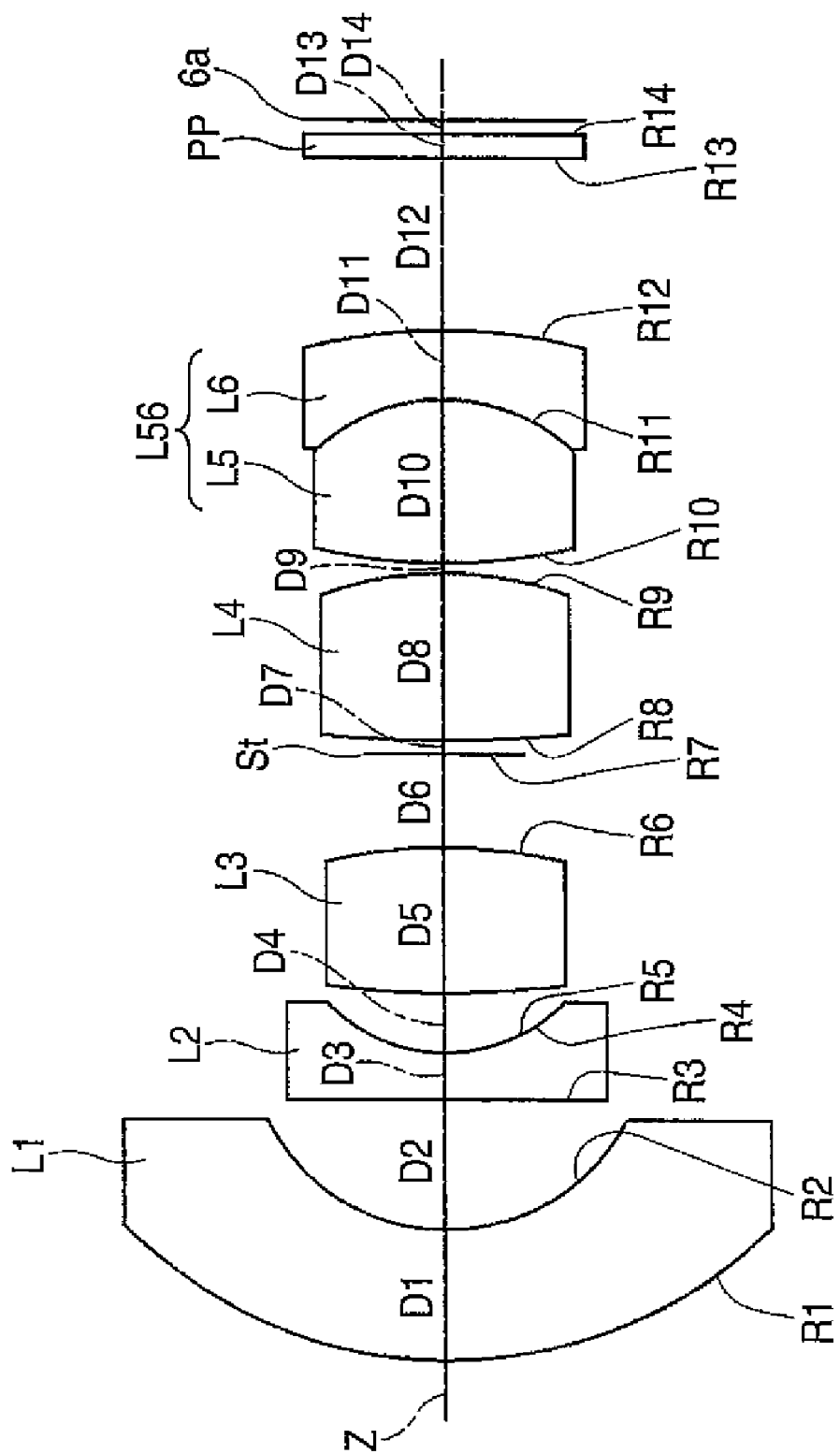
FIG. 9 is a cross-sectional view showing a lens configuration of an imaging lens of a seventh example of the present invention.

Table 7 shows values of specifications of an imaging lens of a seventh example, and FIG. 9 shows a block diagram of the lens. In FIG. 9, reference symbols Ri and Di correspond to Ri and Di of Table 7.

TABLE 7

| | Example 7 | | | |
|---|---|---|---|---|
| Si | Ri | Di | Ndj | vdj |
| 1 | 7.73 | 2.22 | 2.0820 | 30.1 |
| 2 | 3.40 | 2.21 | | |
| 3 | −10000.0 | 0.80 | 1.7725 | 49.6 |
| 4 | 2.73 | 1.02 | | |
| 5 | 14.54 | 2.49 | 1.7999 | 29.8 |
| 6 | −8.80 | 1.60 | | |
| 7 (Aperture Diaphragm) | ∞ | 0.24 | | |
| 8 | 23.31 | 2.86 | 1.8348 | 42.7 |
| 9 | −5.97 | 0.17 | | |
| 10 | 9.29 | 2.81 | 1.7550 | 52.3 |
| 11 | −3.17 | 1.18 | 2.1435 | 17.8 |
| 12 | −9.39 | 2.96 | | |
| 13 | ∞ | 0.40 | 1.5168 | 64.2 |
| 14 | ∞ | 0.25 | | |
| 15 (Imaging Surface) | ∞ | | | |

| | |
|---|---|
| L' | 21.2 |
| L | 21.1 |
| FNo. | 2.0 |
| 2ω | 126.2 |
| f | 2.1 |
| $f_{12}$ | −2.1 |
| $f_{56}$ | 12.3 |
| $f_{128}$ | −5.6 |
| $f_{456}$ | 4.3 |

EIGHTH EXAMPLE

Figure 10:
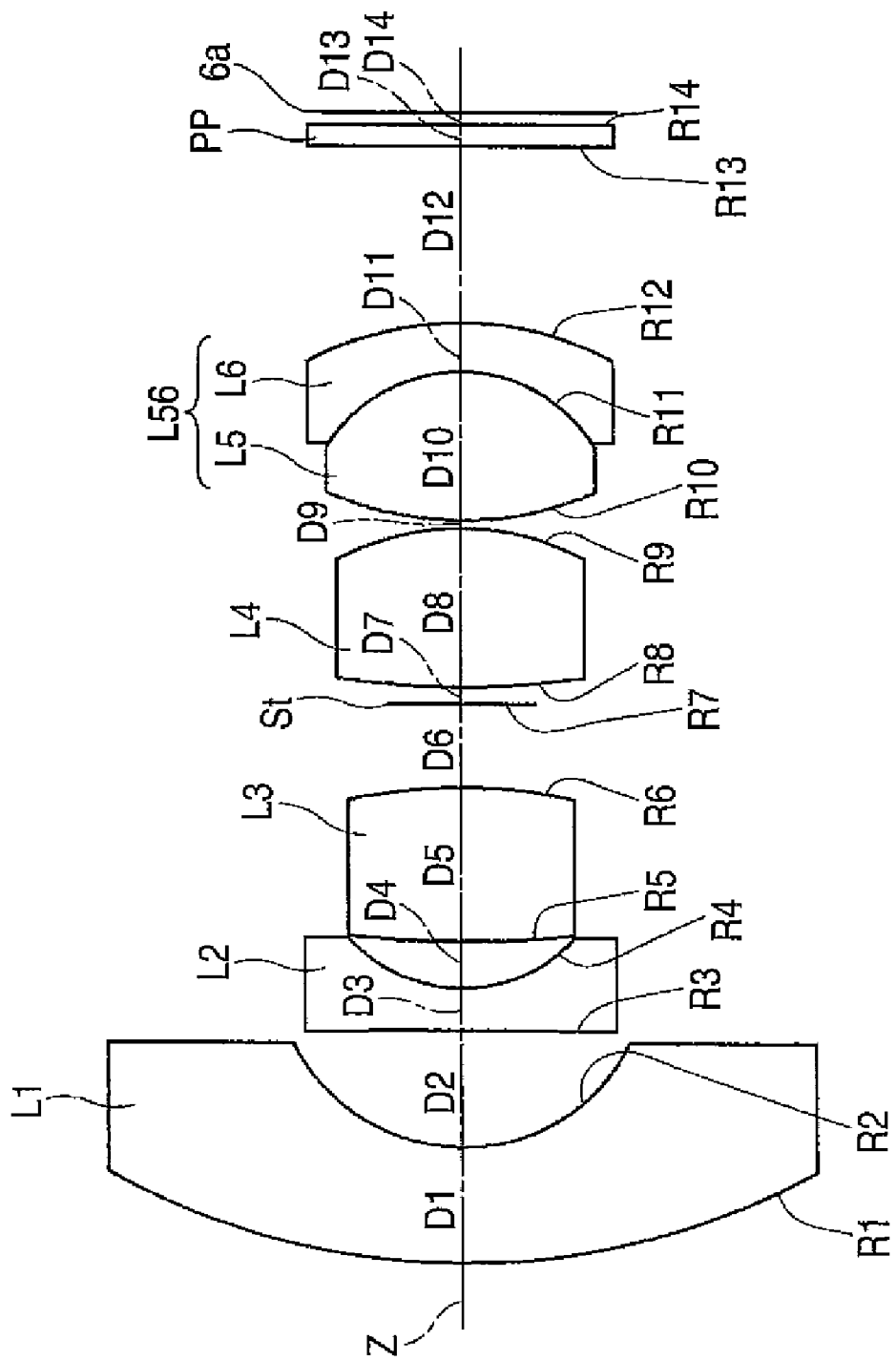
FIG. 10 is a cross-sectional view showing a lens configuration of an imaging lens of an eight example of the present invention.

Table 8 shows values of specifications of an imaging lens of an eighth example, and FIG. 10 shows a block diagram of the lens. In FIG. 10, reference symbols Ri and Di correspond to Ri and Di of Table 8.

TABLE 8

| | Example 8 | | | |
|---|---|---|---|---|
| Si | Ri | Di | Ndj | vdj |
| 1 | 13.52 | 2.17 | 1.8348 | 42.7 |
| 2 | 3.49 | 2.18 | | |
| 3 | −169.95 | 0.80 | 1.7725 | 49.6 |
| 4 | 2.82 | 0.87 | | |
| 5 | 19.13 | 2.90 | 1.8467 | 23.8 |
| 6 | −9.65 | 1.56 | | |
| 7 (Aperture Diaphragm) | ∞ | 0.33 | | |
| 8 | 15.54 | 2.97 | 1.5831 | 59.4 |
| 9 | −4.86 | 0.15 | | |
| 10 | 6.13 | 2.81 | 1.5168 | 64.2 |
| 11 | −2.92 | 0.91 | 1.9229 | 18.9 |
| 12 | −6.07 | 3.31 | | |
| 13 | ∞ | 0.40 | 1.5168 | 64.2 |
| 14 | ∞ | 0.25 | | |
| 15 (Imaging Surface) | ∞ | | | |

| | |
|---|---|
| L' | 21.6 |
| L | 21.5 |
| FNo. | 2.0 |
| 2ω | 166.0 |

TABLE 8-continued

| Example 8 | |
|---|---|
| f | 1.8 |
| $f_{12}$ | −1.9 |
| $f_{56}$ | 10.3 |
| $f_{128}$ | −4.3 |
| $f_{456}$ | 4.5 |

NINTH EXAMPLE

Figure 11:
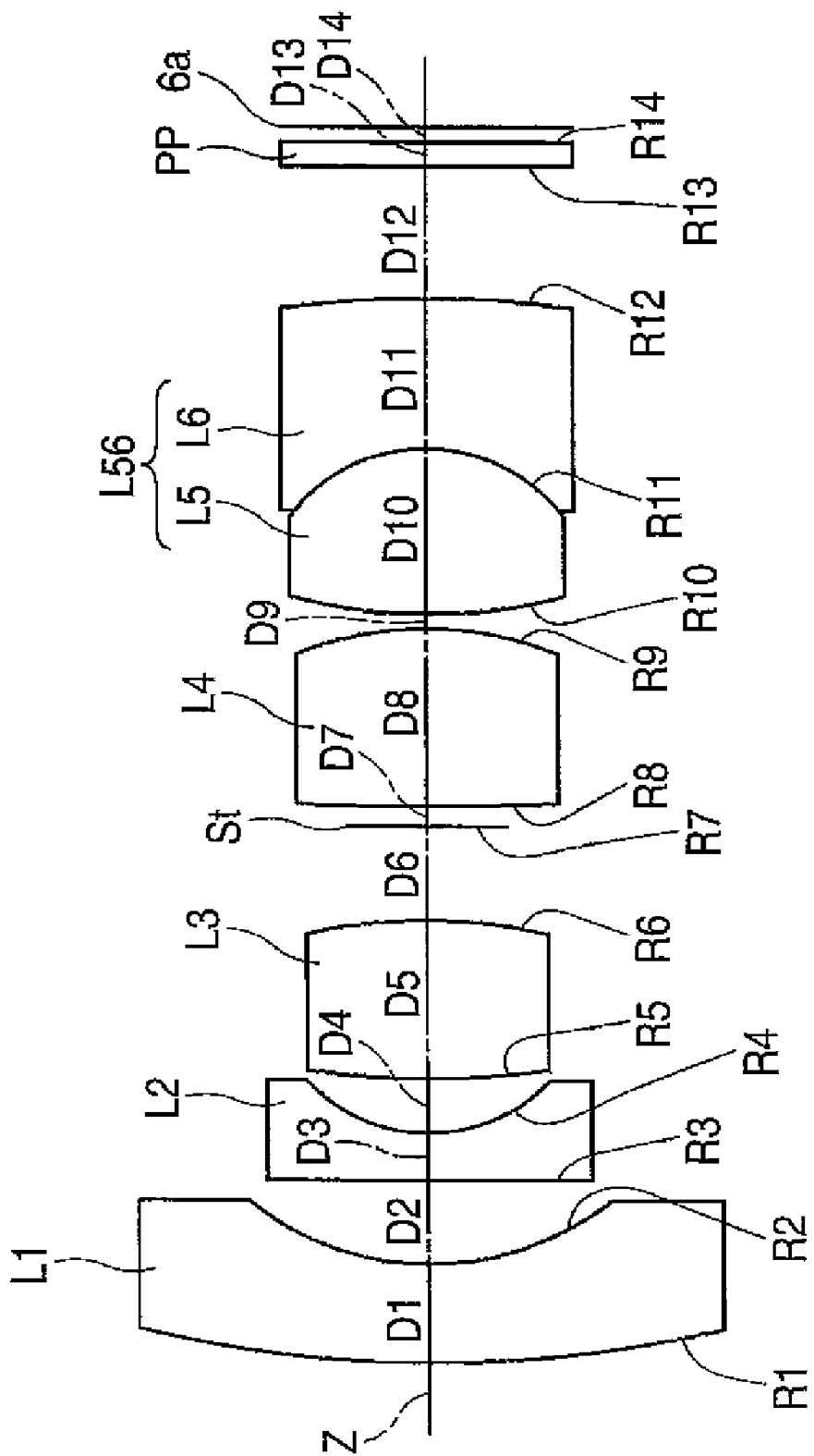
FIG. 11 is a cross-sectional view showing a lens configuration of an imaging lens of a ninth example of the present invention.
Figure 12:
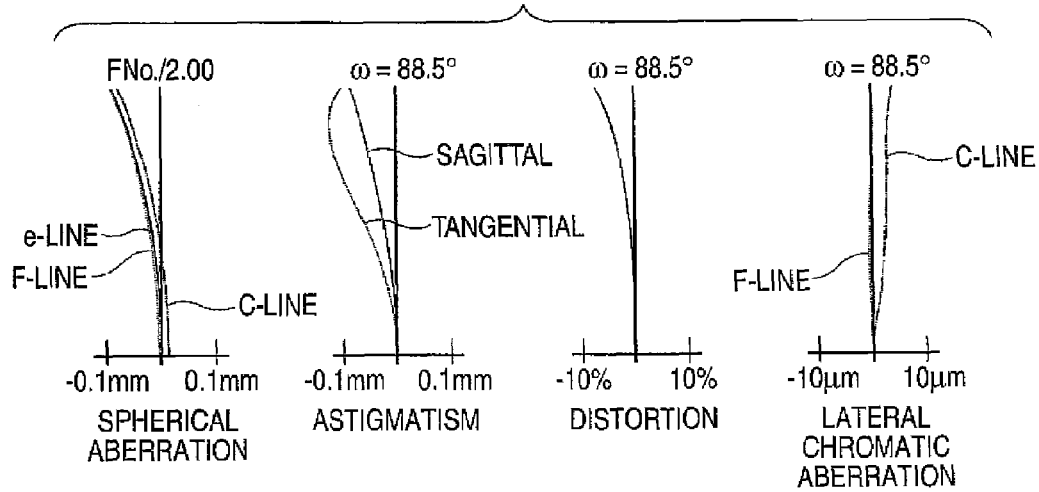
FIG. 12 shows aberration diagrams of the imaging lens of the first example of the present invention.
Figure 13:
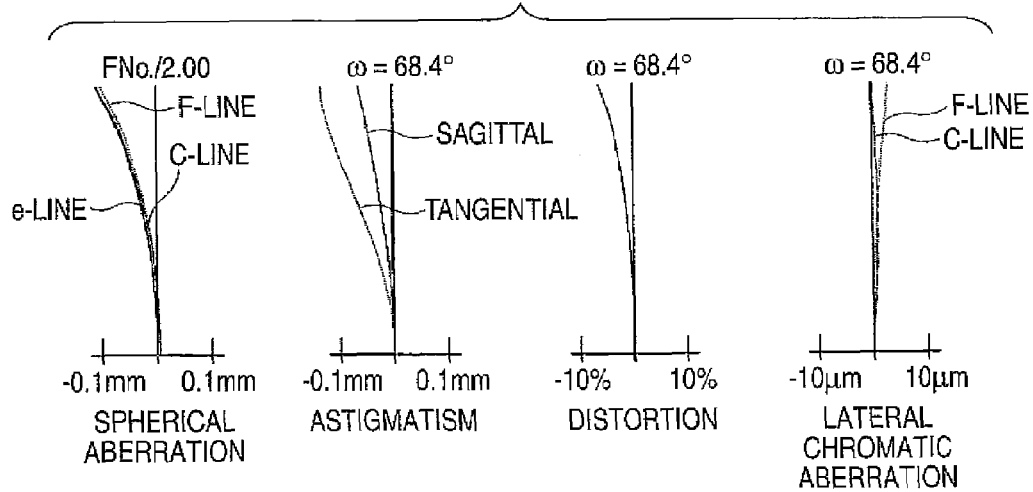
FIG. 13 shows aberration diagrams of the imaging lens of the second example of the present invention.
Figure 14:
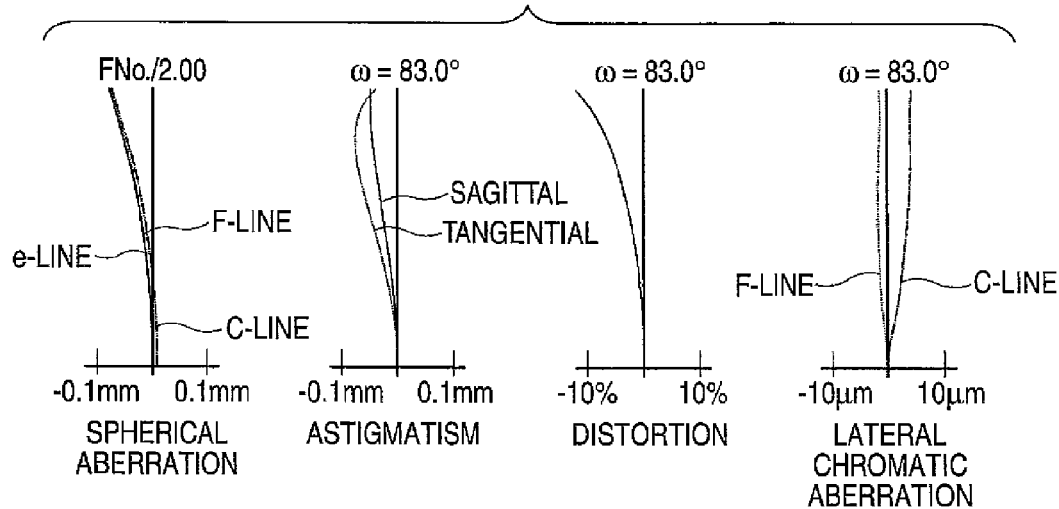
FIG. 14 shows aberration diagrams of the imaging lens of the third example of the present invention.
Figure 15:
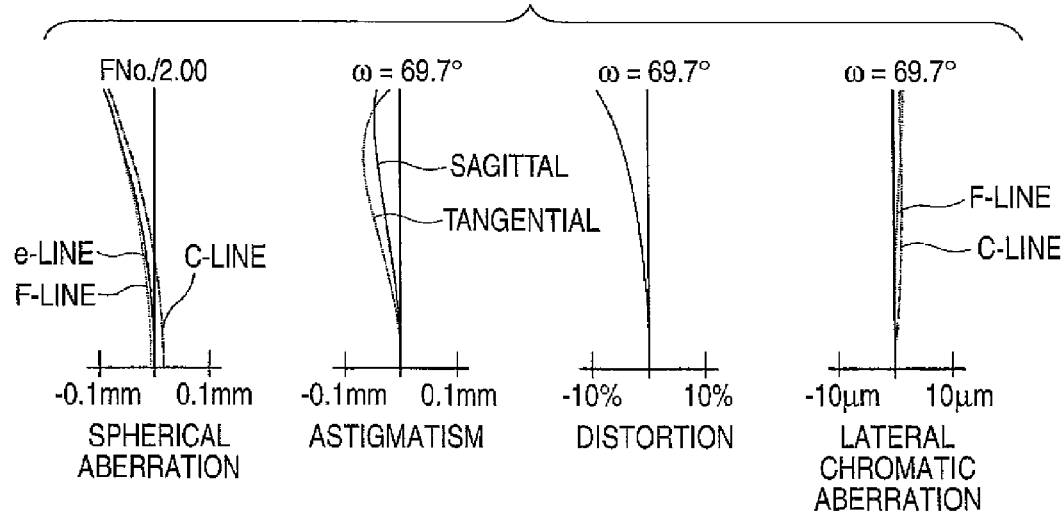
FIG. 15 shows aberration diagrams of the imaging lens of the fourth example of the present invention.
Figure 16:
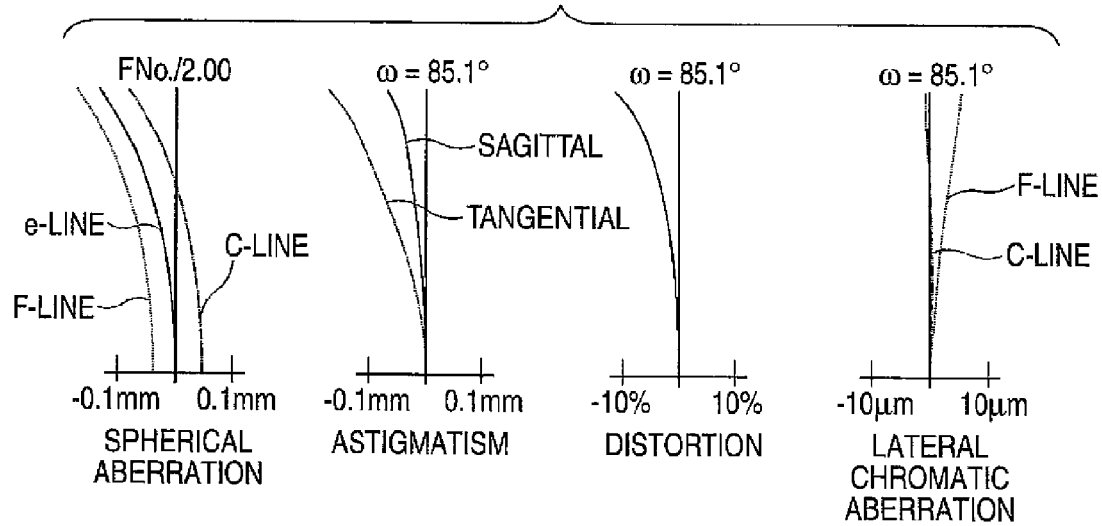
FIG. 16 shows aberration diagrams of the imaging lens of the fifth example of the present invention.
Figure 17:
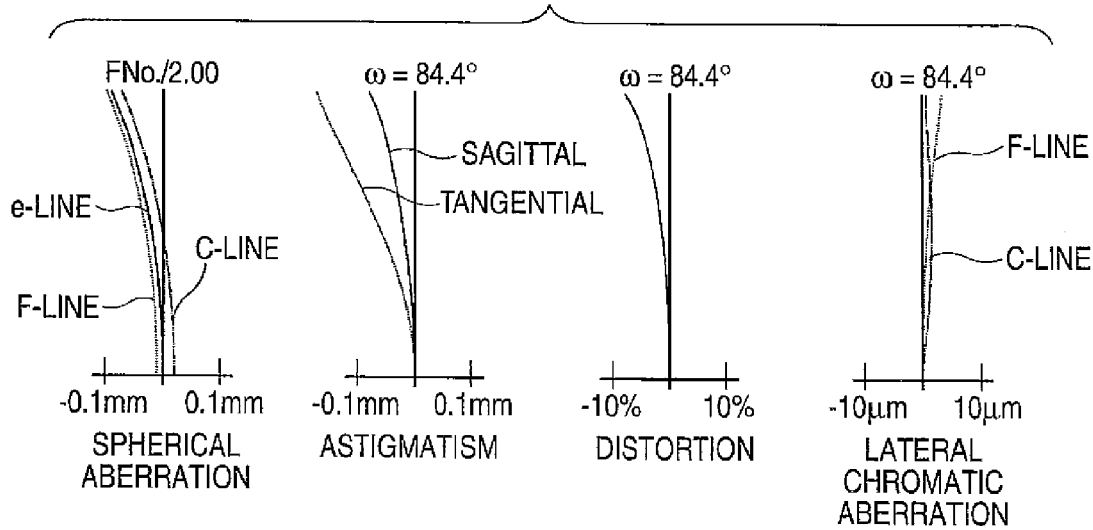
FIG. 17 shows aberration diagrams of the imaging lens of the sixth example of the present invention.
Figure 18:
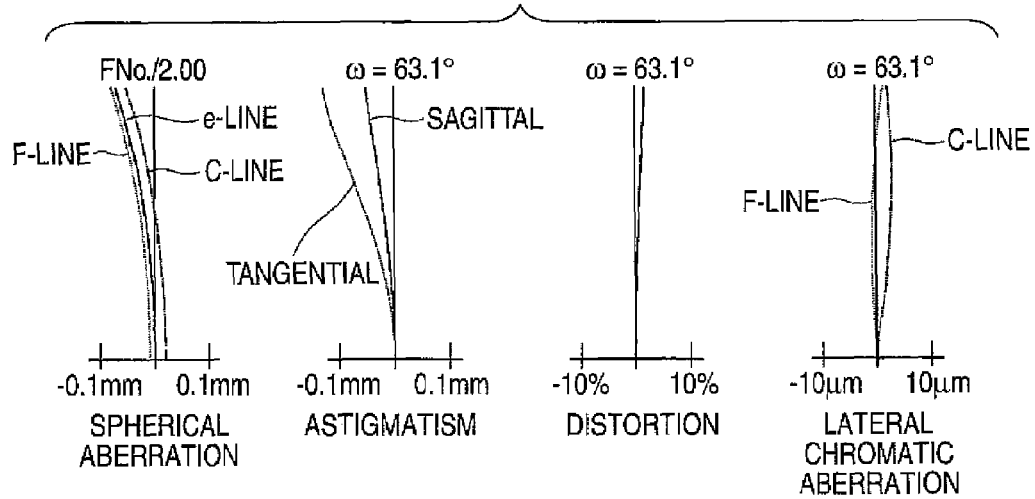
FIG. 18 shows aberration diagrams of the imaging lens of the seventh example of the present invention.
Figure 19:
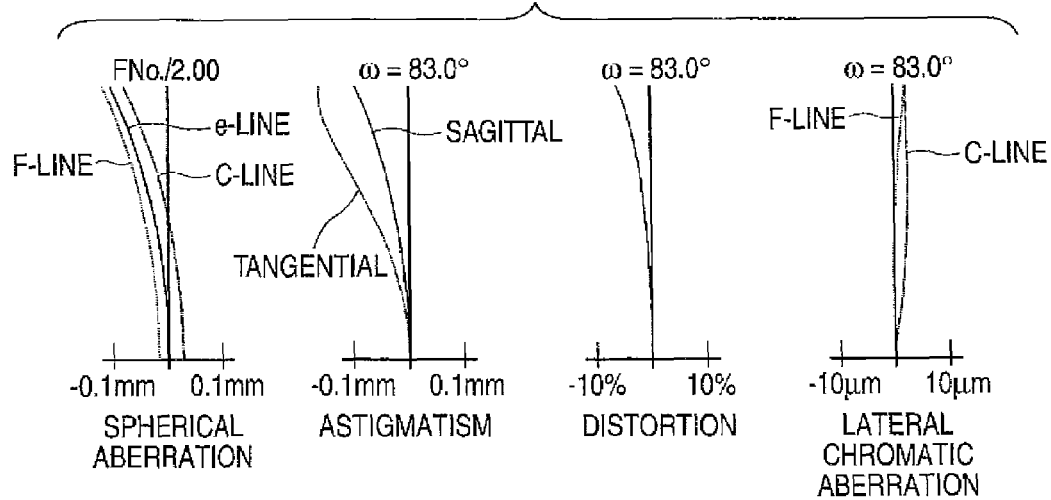
FIG. 19 shows aberration diagrams of the imaging lens of the eighth example of the present invention.
Figure 20:
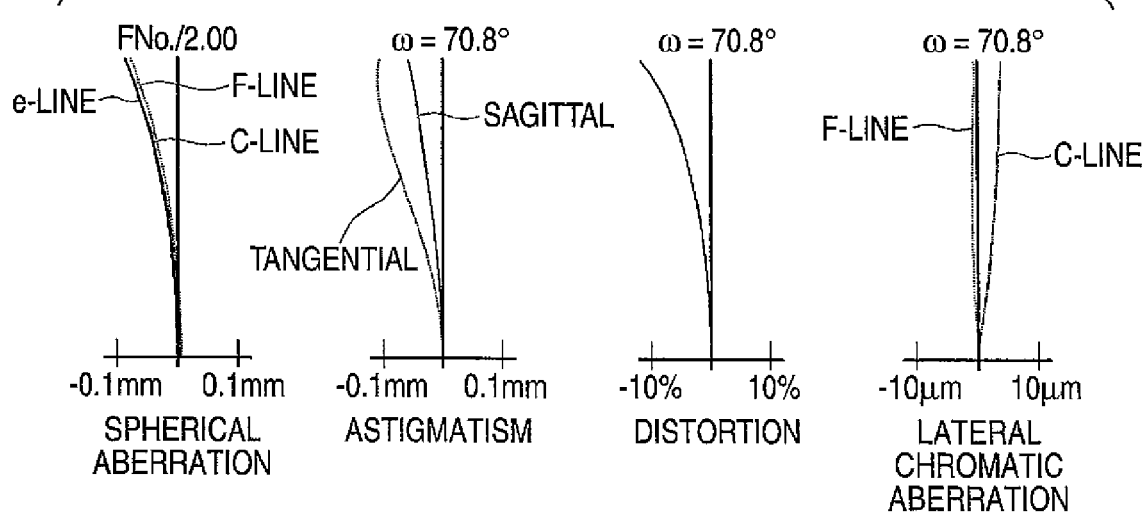
FIG. 20 shows aberration diagrams of the imaging lens of the ninth example of the present invention.

Table 9 shows values of specifications of an imaging lens of a ninth example, and FIG. 11 shows a block diagram of the lens. In FIG. 11, reference symbols Ri and Di correspond to Ri and Di of Table 9.

TABLE 9

| Example 9 | | | | |
|---|---|---|---|---|
| Si | Ri | Di | Ndj | νdj |
| 1 | 20.84 | 1.66 | 1.8348 | 42.7 |
| 2 | 4.77 | 1.41 | | |
| 3 | ∞ | 0.80 | 1.7725 | 49.6 |
| 4 | 2.78 | 0.92 | | |
| 5 | 14.58 | 2.66 | 1.8340 | 37.2 |
| 6 | −8.71 | 1.57 | | |
| 7 (Aperture Diaphragm) | ∞ | 0.34 | | |
| 8 | 53.83 | 3.00 | 1.8830 | 40.8 |
| 9 | −5.83 | 0.24 | | |
| 10 | 8.92 | 2.81 | 1.7550 | 52.3 |
| 11 | −2.88 | 2.52 | 1.9229 | 18.9 |
| 12 | −17.72 | 2.23 | | |
| 13 | ∞ | 0.40 | 1.5168 | 64.2 |
| 14 | ∞ | 0.25 | | |
| 15 (Imaging Surface) | ∞ | | | |

| | |
|---|---|
| L' | 20.8 |
| L | 20.7 |
| FNo. | 2.0 |
| 2ω | 141.6 |
| f | 2.1 |
| $f_{12}$ | −2.1 |
| $f_{56}$ | 13.2 |
| $f_{128}$ | −6.1 |
| $f_{456}$ | 4.4 |

Values of the imaging lenses of the first through ninth examples corresponding to the conditional expressions (5) to (12) are now shown in Table 10.

TABLE 10

| | Conditional Experession | | | | | | | |
|---|---|---|---|---|---|---|---|---|
| | (5) $N_n - N_p$ | (6) $ν_p/ν_n$ | (7) $|f_{12}/f|$ | (8) $f_{128}$ | (9) $f_{56}/f$ | (10) $L/f$ | (11) $D_1/f$ | (12) $f_{456}/f$ |
| Lower Limit | 0.05 | 1.5 | 0.5 | — | 3 | 7 | 0.55 | 1.7 |
| Upper Limit | 0.45 | 5.5 | 2 | 0 | 10 | 14 | — | 3.0 |
| Example 1 | 0.21 | 2.9 | 1.1 | −9.4 | 6.0 | 11.7 | 1.1 | 2.5 |
| Example 2 | 0.21 | 2.9 | 0.9 | −8.3 | 6.8 | 10.0 | 0.9 | 2.2 |
| Example 3 | 0.21 | 2.9 | 1.7 | −20.7 | 4.4 | 12.2 | 0.7 | 2.4 |
| Example 4 | 0.21 | 2.9 | 1.6 | −24.7 | 3.4 | 10.0 | 0.7 | 2.2 |
| Example 5 | 0.34 | 3.1 | 1.0 | −6.8 | 9.6 | 11.2 | 0.9 | 2.5 |
| Example 6 | 0.21 | 2.9 | 1.1 | −7.6 | 6.2 | 11.8 | 0.9 | 2.5 |
| Example 7 | 0.39 | 2.9 | 1.0 | −5.6 | 5.9 | 10.1 | 1.1 | 2.1 |
| Example 8 | 0.41 | 3.4 | 1.0 | −4.3 | 5.6 | 11.7 | 1.2 | 2.5 |
| Example 9 | 0.17 | 2.8 | 1.0 | −6.1 | 6.2 | 9.6 | 0.8 | 2.1 |

As is evident from the above tables, in each of the imaging lenses of the first through ninth example, there are arranged the negative first lens L1 whose concave surface is directed toward the image side; the second lens L2 which is a planoconcave lens whose plane surface is directed toward the object side or a biconcave lens whose surface having a larger absolute value of radius of curvature is directed toward the object side; the third lens L3 assuming a biconvex shape; the aperture diaphragm St; the fourth lens L4 whose surface having a smaller absolute value of radius of curvature is directed toward the image side and which has positive refractive power; and the cemented lens L56 consisting of the positive fifth lens L5 assuming a biconvex shape and the meniscus negative sixth lens L6 having positive refractive power. The conditional expressions (1) and (3) through (12) are satisfied. In the sixth and seventh embodiments, the conditional expression (2) is also satisfied.

FIGS. 12 through 20 show aberration diagrams of a spherical aberration, astigmatism, distortion, and lateral chromatic aberration of the imaging lenses of the first through ninth examples. Each of the aberration diagrams shows an aberration acquired while the e-line (546.07 nm) is taken as a reference wavelength, and the spherical aberration diagram and the lateral chromatic aberration diagram also show aberrations achieved at the F-line (486.1 nm). The distortion diagram shows amounts of deviation from fω (a product of the focal length "f" of the entire system and a half angle of view ω) which is taken as an ideal height. F number of the vertical axis of the spherical aberration diagram shows an F value, and ω of the vertical axes of the other aberration diagrams designate a half angle of view. As can be seen from FIGS. 12 through 20, the aberrations of the first through ninth examples are well corrected.

Although the present invention has been described by reference to the embodiments and examples, the present invention is not limited to the embodiments and examples and is susceptible to various modifications. For instance, values of curvature radii, on-axis surface spacing, and refractive indices of the respective lens components are not limited to the values described in connection with the respective numerical embodiments and can assume other values.

The above embodiments have described the case where the present invention is applied to the onboard camera. However, the present invention is not limited to the application and can also be applied to; for example, a camera for a portable terminal, a surveillance camera, and the like.

What is claimed is:

1. An imaging lens comprising: in order from an object side of the imaging lens,
a first lens having a negative refractive power and having a concave surface directed toward an image side of the imaging lens;
a second lens that is one of a planoconcave lens having a flat surface directed toward the object side and a biconcave lens whose surface having a larger absolute value of radius of curvature is directed toward the object side;
a third biconvex lens;
a stop;
a fourth lens whose surface having a smaller absolute value of radius of curvature is directed toward the image side, the fourth lens having a positive refractive power; and
a cemented lens having a positive refractive power, the cemented lens including a fifth lens and a sixth lens, the fifth lens having a positive refractive power and having a biconvex shape, the sixth lens having a negative refractive power and having a meniscus shape, the imaging lens satisfying conditional expressions:

$$v_3 < 43 \quad (1)$$

$$0.05 < N_n - N_p < 0.45 \quad (5)$$

$$2.8 \leq v_p/v_n < 5.5 \quad (6')$$

wherein $v_3$ represents an Abbe number of the third lens at the d-line, and wherein $N_p$ represents a refractive index of the positive lens constituting the cemented lens at the d-line, $N_n$ represents a refractive index of the negative lens constituting the cemented lens at the d-line, $v_p$ represents an Abbe number of the positive lens constituting the cemented lens at the d-line, and $v_n$ represents an Abbe number of the negative lens constituting the cemented lens at the d-line.

2. The imaging lens according to claim 1, further satisfying a conditional expression:

$$0.5 < |f_{12}/f| < 2 \quad (7)$$

wherein $f_{12}$ represents a composite focal length of the first lens and the second lens, and f represents a focal length of the imaging lens.

3. The imaging lens according to claim 2, further satisfying a conditional expression:

$$f_{123} < 0 \quad (8)$$

wherein $f_{123}$ represents a composite focal length of the first lens, the second lens, and the third lens.

4. The imaging lens according to claim 3, further satisfying a conditional expression:

$$3 < f_{56}/f < 10 \quad (9)$$

wherein $f_{56}$ represents a composite focal length of the fifth lens and the sixth lens, and f represents a focal length of the imaging lens.

5. The imaging lens according to claim 4, further satisfying a conditional expression:

$$7 < L/f < 14 \quad (10)$$

wherein L represents a distance along an optical axis from an object-side surface of the first lens to an image-side focal plane of the imaging lens, provided that the distance from the third biconvex lens to the image-side focal plane is converted into air, and f represents a focal length of the imaging lens.

6. An imaging device comprising:
an imaging lens according to claim 5; and
an imaging element that converts an optical image formed by means of the imaging lens into an electric signal.

7. The imaging lens according to claim 1, further satisfying a conditional expression:

$$f_{123} < 0 \quad (8)$$

wherein $f_{123}$ represents a composite focal length of the first lens, the second lens, and the third lens.

8. The imaging lens according to claim 1, further satisfying a conditional expression:

$$3 < f_{56}/f < 10 \quad (9)$$

wherein $f_{56}$ represents a composite focal length of the fifth lens and the sixth lens, and f represents a focal length of the imaging lens.

9. The imaging lens according to claim 1, further satisfying a conditional expression:

$$7 < L/f < 14 \quad (10)$$

wherein L represents a distance along an optical axis from an object-side surface of the first lens to an image-side focal plane of the imaging lens, provided that the distance from the third biconvex lens to the image-side focal plane is converted into air, and f represents a focal length of the imaging lens.

10. An imaging device comprising:
an imaging lens according to claim 1; and
an imaging element that converts an optical image formed by means of the imaging lens into an electric signal.

* * * * *